US012737597B2

(12) United States Patent
Raposas et al.

(10) Patent No.: US 12,737,597 B2
(45) Date of Patent: Sep. 15, 2026

(54) METHODS AND APPARATUS TO IDENTIFY, CLASSIFY, AND EDIT ARTIFICIAL SPIKES IN CRUISE GUIDE INDICATOR SIGNAL DATA

(71) Applicant: The Boeing Company, Arlington, VA (US)

(72) Inventors: Vincent T. Raposas, Sewell, NJ (US); David G. Miller, Mount Laurel, NJ (US); Yi Lu, Media, PA (US)

(73) Assignee: The Boeing Company, Arlington, VA (US)

( * ) Notice: Subject to any disclaimer, the term of this patent is extended or adjusted under 35 U.S.C. 154(b) by 766 days.

(21) Appl. No.: 18/166,384

(22) Filed: Feb. 8, 2023

(65) Prior Publication Data

US 2024/0265244 A1 Aug. 8, 2024

(51) Int. Cl.
*G06N 3/049* (2023.01)

(52) U.S. Cl.
CPC .................................... *G06N 3/049* (2013.01)

(58) Field of Classification Search
CPC ........... G06N 3/049; G08G 5/21; G08G 5/23; G08G 5/26; G08G 5/53
See application file for complete search history.

(56) References Cited

U.S. PATENT DOCUMENTS

| | | | | |
|---|---|---|---|---|
| 6,334,099 B1 * | 12/2001 | Grace | G16B 25/00 702/194 |
| 6,725,027 B1 * | 4/2004 | Tsuji | H04B 1/1081 455/226.1 |
| 2003/0062885 A1 * | 4/2003 | Ballan | H03G 3/345 324/76.28 |
| 2016/0224830 A1 * | 8/2016 | Noda | G01N 30/8634 |
| 2020/0046265 A1 * | 2/2020 | Kaifosh | A61B 5/388 |
| 2022/0065778 A1 * | 3/2022 | Katchanov | G01J 3/44 |

OTHER PUBLICATIONS

Keller, Initial Results From the Vibration Management Enhancement Program for Army Cargo Helicopters, Presented at the American Helicopter Society 62nd Annual Forum, Phoenix, AZ, May 9-11, 2006 (Year: 2006).*

(Continued)

*Primary Examiner* — Michael J Dalbo
(74) *Attorney, Agent, or Firm* — Hanley, Flight & Zimmerman, LLC

(57) ABSTRACT

Methods and apparatus to identify, classify, and edit artificial spikes in cruise guide indicator (CGI) signal data are disclosed. An example apparatus includes memory, machine-readable instructions, and processor circuitry. The processor circuitry is to execute the machine-readable instructions to identify a spike in the CGI signal data. The processor circuitry is to execute the machine-readable instructions to determine whether the spike is an artificial spike. In response to determining that the spike is an artificial spike, the processor circuitry is to execute the machine-readable instructions to replace a portion of the CGI signal data including the artificial spike and a transient response of the artificial spike with edited CGI signal data.

21 Claims, 19 Drawing Sheets

(56) References Cited

OTHER PUBLICATIONS

Brown et al., "The CH-47 Cruise Guide Indicator," presented at the 26th Annual National Forum of the American Helicopter Society, Washington, D.C., Jun. 1970, 7 pages.
Marchand et al., "Binomial smoothing filter: A way to avoid some pitfalls of least-squares polynomial smoothing," Rev. Sci. Instrum. 54(8), Aug. 1983, 8 pages.
110th Aviation Training Brigade, "CH-47D Flight Instrument System," Student Handout, File No. 011-2101-3, United States Army Warfighting Center, Oct. 2006, 24 pages.

* cited by examiner

102

AIRCRAFT

106

ROTOR NO. 1

202

STRAIN GAUGE NO. 1

206

SIGNAL PROCESSOR UNIT NO. 1

208

SIGNAL PROCESSOR UNIT NO. 2

204

STRAIN GAUGE NO. 2

108

ROTOR NO. 2

210

CRUISE GUIDE INDICATOR

212

NETWORK INTERFACE

214

COMM. DEVICE(S)

216

MEMORY

1000

METHODS AND APPARATUS TO IDENTIFY, CLASSIFY, AND EDIT ARTIFICIAL SPIKES IN CRUISE GUIDE INDICATOR SIGNAL DATA

STATEMENT OF GOVERNMENT INTEREST

This invention was made with government support under CHC/087-378 awarded by the UK Ministry of Defence. The UK government has certain rights in this invention.

FIELD OF THE DISCLOSURE

This disclosure relates generally to methods and apparatus to evaluate cruise guide indicator signal data and, more specifically, to methods and apparatus to identify, classify, and edit artificial spikes in cruise guide indicator signal data.

BACKGROUND

Rotary-wing aircraft (e.g., helicopters), also known as rotorcraft, include one or more rotor(s) which generate lift by rotating about a vertical mast or axis of rotation. During flight, the rotor(s) of such aircraft are subjected to stress from various applied aerodynamic forces. Information (e.g., signals and/or other data) associated with the magnitude, the duration, and/or the frequency of the stress experienced by the rotor(s) of the aircraft can be of critical value with regard to the current (e.g., real-time) or future operation of the aircraft. It is accordingly a common practice for such information to be sensed, measured, and/or recorded during operation (e.g., during flight) of the aircraft.

In some examples, information associated with the magnitude, the duration, and/or the frequency of the stress experienced by the rotor(s) of the aircraft is presented (e.g., displayed) in real-time to an operator (e.g., a pilot) of the aircraft. The operator of the aircraft can evaluate the presented information in real-time during flight of the aircraft, and adjust one or more operation(s) of the aircraft based on the presented information. In other examples, information (e.g., signals and/or other data) associated with the magnitude, the duration, and/or the frequency of the stress experienced by the rotor(s) of the aircraft is communicated (e.g., transmitted or otherwise transferred) from the aircraft to a remotely-located device such as a ground station. In such other examples, an evaluation engine (e.g., a processor platform) of the ground station can evaluate the information to determine whether there is a need to repair or replace any component associated with the rotor(s) of the aircraft.

In some known rotary-wing aircraft, information associated with the magnitude, the duration, and/or the frequency of the stress experienced by the rotor(s) of the aircraft is presented (e.g., displayed) in real-time to an operator (e.g., a pilot) of the aircraft via an instrument commonly referred to as a cruise guide indicator (CGI). The CGI signal data which facilitates the presentation of information at and/or by the CGI is typically recorded and stored as part of the Flight Data Recorder (FDR) data of the aircraft. The operator of the aircraft can evaluate the output of the CGI in real-time during flight of the aircraft, and adjust one or more operation(s) of the aircraft accordingly. For example, if the output of the CGI indicates that a rotor of the aircraft is being subjected to an undesirable or unacceptable level of stress, the operator can adjust one or more operation(s) of the aircraft to reduce the level of stress to which the rotor is being subjected. The CGI signal data recorded by the aircraft can also be communicated (e.g., transmitted or otherwise transferred) from the aircraft to a remotely-located device such as a ground station. An evaluation engine (e.g., a processor platform) of the ground station can evaluate the CGI signal data to determine whether there is a need to repair or replace any component associated with the rotor(s) of the aircraft.

SUMMARY

Methods and apparatus to identify, classify, and edit artificial spikes in cruise guide indicator (CGI) signal data are disclosed. In some examples, an apparatus is disclosed. In some disclosed examples, the apparatus includes memory, machine-readable instructions, and processor circuitry. In some disclosed examples, the processor circuitry is to execute the machine-readable instructions to identify a spike in CGI signal data. In some disclosed examples, the processor circuitry is to execute the machine-readable instructions to determine whether the spike is an artificial spike. In some disclosed examples, in response to determining that the spike is an artificial spike, the processor circuitry is to execute the machine-readable instructions to replace a portion of the CGI signal data including the artificial spike and a transient response of the artificial spike with edited CGI signal data.

In some examples, a non-transitory machine-readable storage medium comprising instructions is disclosed. In some disclosed examples, the instructions, when executed, cause processor circuitry to identify a spike in CGI signal data. In some disclosed examples, the instructions, when executed, cause the processor circuitry to determine whether the spike is an artificial spike. In some disclosed examples, the instructions, when executed, cause the processor circuitry, in response to determining that the spike is an artificial spike, to replace a portion of the CGI signal data including the artificial spike and a transient response of the artificial spike with edited CGI signal data.

In some examples, a method is disclosed. In some disclosed examples, the method includes identifying, by executing machine-readable instructions with processor circuitry, a spike in CGI signal data. In some disclosed examples, the method includes determining, by executing machine-readable instructions with the processor circuitry, whether the spike is an artificial spike. In some disclosed examples, the method, in response to determining that the spike is an artificial spike, includes replacing, by executing machine-readable instructions with the processor circuitry, a portion of the CGI signal data including the artificial spike and a transient response of the artificial spike with edited CGI signal data.

Figure 1:
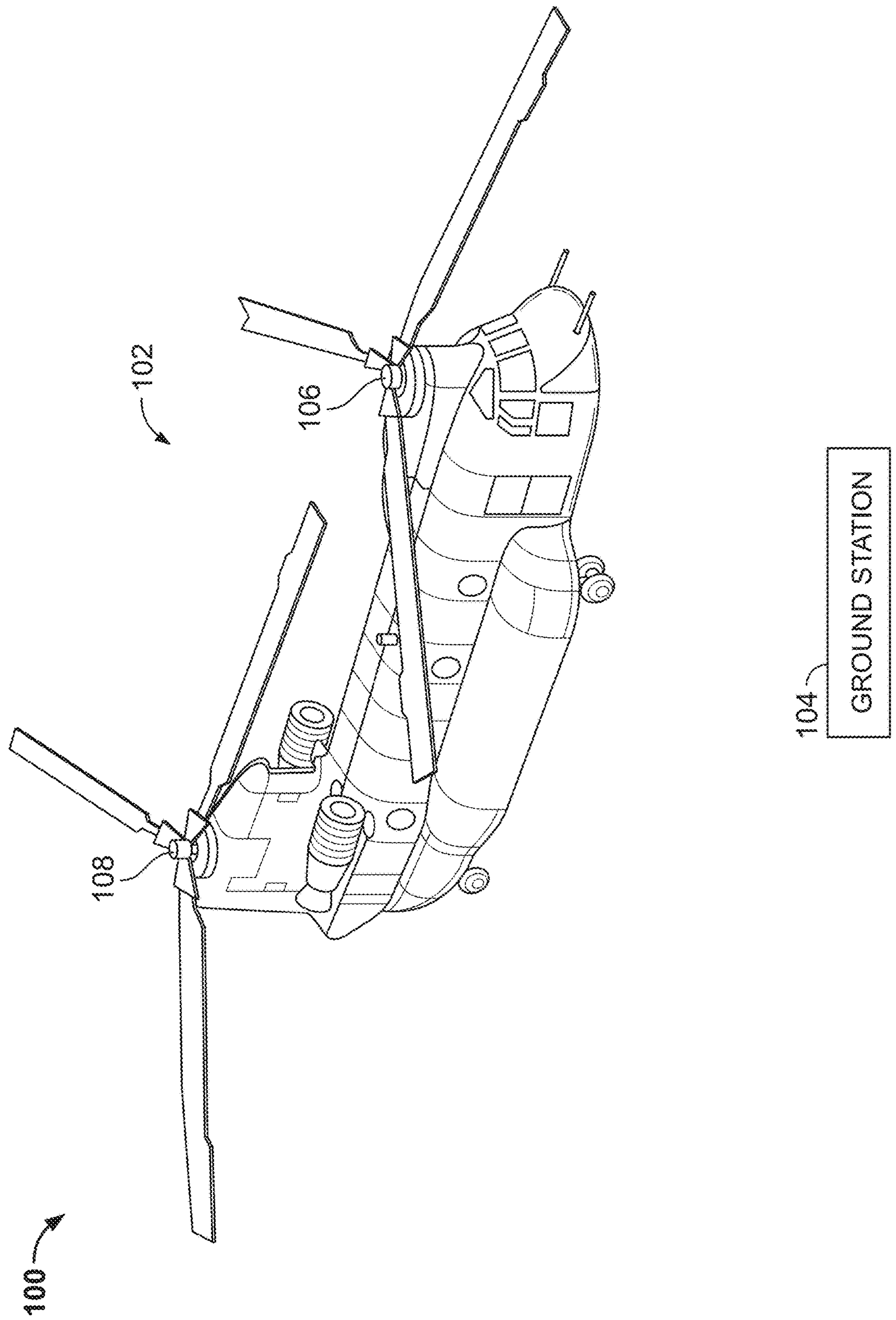
FIG. 1 illustrates an operational environment including an aircraft and a ground station.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In some known rotary-wing aircraft, CGI signal data is presented (e.g., displayed) in real-time to an operator (e.g., a pilot) of the aircraft via a CGI of the aircraft. The CGI signal data is also typically recorded and stored as part of the FDR data of the aircraft. The operator of the aircraft can evaluate the output of the CGI in real-time during flight of the aircraft, and adjust one or more operation(s) of the aircraft accordingly. For example, if the output of the CGI indicates that a rotor of the aircraft is being subjected to an undesirable or unacceptable level of stress, the operator can adjust one or more operation(s) of the aircraft to reduce the level of stress to which the rotor is being subjected. The CGI signal data recorded by the aircraft can also be communicated (e.g., transmitted or otherwise transferred) from the aircraft to a remotely-located device such as a ground station. An evaluation engine (e.g., a processor platform) of the ground station can evaluate the CGI signal data to determine whether there is a need to repair or replace any component associated with the rotor(s) of the aircraft.

In some instances, the CGI signal data includes an airload-driven spike corresponding to a sharp increase in the level of stress experienced by one or more component(s) of one or more rotor(s) of the aircraft as a result of aerodynamic forces applied to the component(s) of the rotor(s). The identification and evaluation of airload-driven spikes in CGI signal data can inform decisions with regard to whether one or more component(s) of the rotor(s) of the aircraft need to be repaired, replaced, and/or otherwise serviced. In other instances, the CGI signal data includes an artificial spike which, unlike an airload-driven spike, has effectively no relation to the level of stress experienced by the component(s) of the rotor(s) of the aircraft. An artificial spike can be present in the CGI signal data, for example, as a result of electrical load switching associated with one or more electrical component(s) of the aircraft. An artificial CGI spike typically includes an associated transient response (e.g., a gradual decrease and/or decay in magnitude) extending from an unrealistic peak CGI value to a valid CGI value over a duration of time that is greater than ten seconds. The presence of such a transient response, however, is typically not a sufficient indicator with regard to distinguishing an artificial spike from an airload-driven spike, as airload-driven spikes can in some instances also include such a transient response.

As artificial CGI spikes have effectively no relation to the level of stress experienced by the component(s) of the rotor(s) of the aircraft, such spikes are accordingly of no value with regard to informing repair, replacement, and/or servicing decisions for the component(s) of the rotor(s) of the aircraft. Methods and apparatus disclosed herein advantageously identify, classify, and edit artificial spikes in CGI signal data. The disclosed methods and apparatus cause each identified artificial spike and its associated transient response to be removed from the CGI signal data and replaced with edited CGI signal data corresponding to a value of a last valid CGI point (e.g., immediately prior to the start of the artificial spike) of the CGI signal data.

In some examples, the disclosed methods and apparatus post-process CGI signal data (e.g., as may be included in FDR data) to identify CGI spikes, to classify those spikes as either artificial spikes or airload-driven/undetermined spikes, and to remove, replace, and/or otherwise edit the artificial spikes and their associated transient responses. In some examples, the disclosed methods and apparatus implement numerous time rate-of-change indicators (e.g., CGI derivative, lagged CGI derivative, washout CGI, smoothed lagged CGI derivative, lagged CGI, etc.) and numerous empirically-determined criteria (e.g., CGI derivative threshold, lagged CGI derivative threshold, washout CGI threshold, low CGI threshold, etc.) that are configured to distinguish artificial CGI spikes from airload-driven/undetermined CGI spikes, and/or that are otherwise configured to facilitate the identification and/or the removal of artificial CGI spikes and their associated transient responses. Once a CGI spike has been classified as artificial, the disclosed methods and apparatus, again utilizing one or more of the time rate-of-change indicators and/or one or more of the empirically-determined criteria, determine start and end times for editing the artificial spike and its transient response. The disclosed methods and apparatus remove a portion of the CGI signal data extending between the determined start and end times, and replace the removed portion of the CGI signal data with edited CGI signal data having a value corresponding to a value of the last valid CGI point (e.g., immediately prior to the start of the artificial spike). In some examples, the disclosed methods and apparatus implement a timeout function to limit the impact of any unrealistically long computed durations (e.g., abnormally lengthy durations between the determined start and end times) of the artificial spike and its associated transient response that would otherwise result in the removal and replacement of a correspondingly large portion of the CGI signal data.

The disclosed methods and apparatus remove and replace the identified artificial spikes and their associated transient responses without corrupting valid portions of the CGI signal data. Such an approach to minimizing the inclusion of artificial spikes in post-processed CGI signal data is highly advantageous relative to other possible minimization approaches (e.g., implementation of a low-pass filter) which can corrupt one or more valid portion(s) of the CGI signal data when applied. In addition to removing and replacing artificial spikes and their transient responses, the disclosed methods and apparatus advantageously and purposefully preserve (e.g., refrain from removing and/or replacing) valid airload-driven spikes, as well as other CGI spikes which cannot be identified and/or classified as being artificial spikes. Implementation of the disclosed methods and apparatus for identifying, classifying, and editing artificial spikes in CGI signal data accordingly occurs without corrupting any valid portion of the CGI signal data, thereby improving the reliability of aircraft rotor load monitoring.

The above-identified features as well as other advantageous features of example methods and apparatus to identify, classify, and edit artificial spikes in CGI signal data as disclosed herein are further described below in connection with the figures of the application.

As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of processor circuitry configured to perform a specified operation, the processor circuitry is arranged, structured, and/or programmed (e.g., based on machine-readable instructions) to perform the specified operation.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

FIG. 1 illustrates an operational environment 100 including an aircraft 102 and a ground station 104. The aircraft 102 of FIG. 1 is a rotary-wing aircraft (e.g., a helicopter) having one or more rotor(s) that generate(s) lift by rotating about a vertical mast or axis of rotation. In the illustrated example of FIG. 1, the aircraft 102 includes a first rotor 106 (e.g., a forward rotor) and a second rotor 108 (e.g., an aft rotor). In other examples, the aircraft 102 of FIG. 1 includes a different number of rotors (e.g., one rotor, three rotors, four rotors, etc.) relative to the two rotors shown in FIG. 1.

Figure 2:
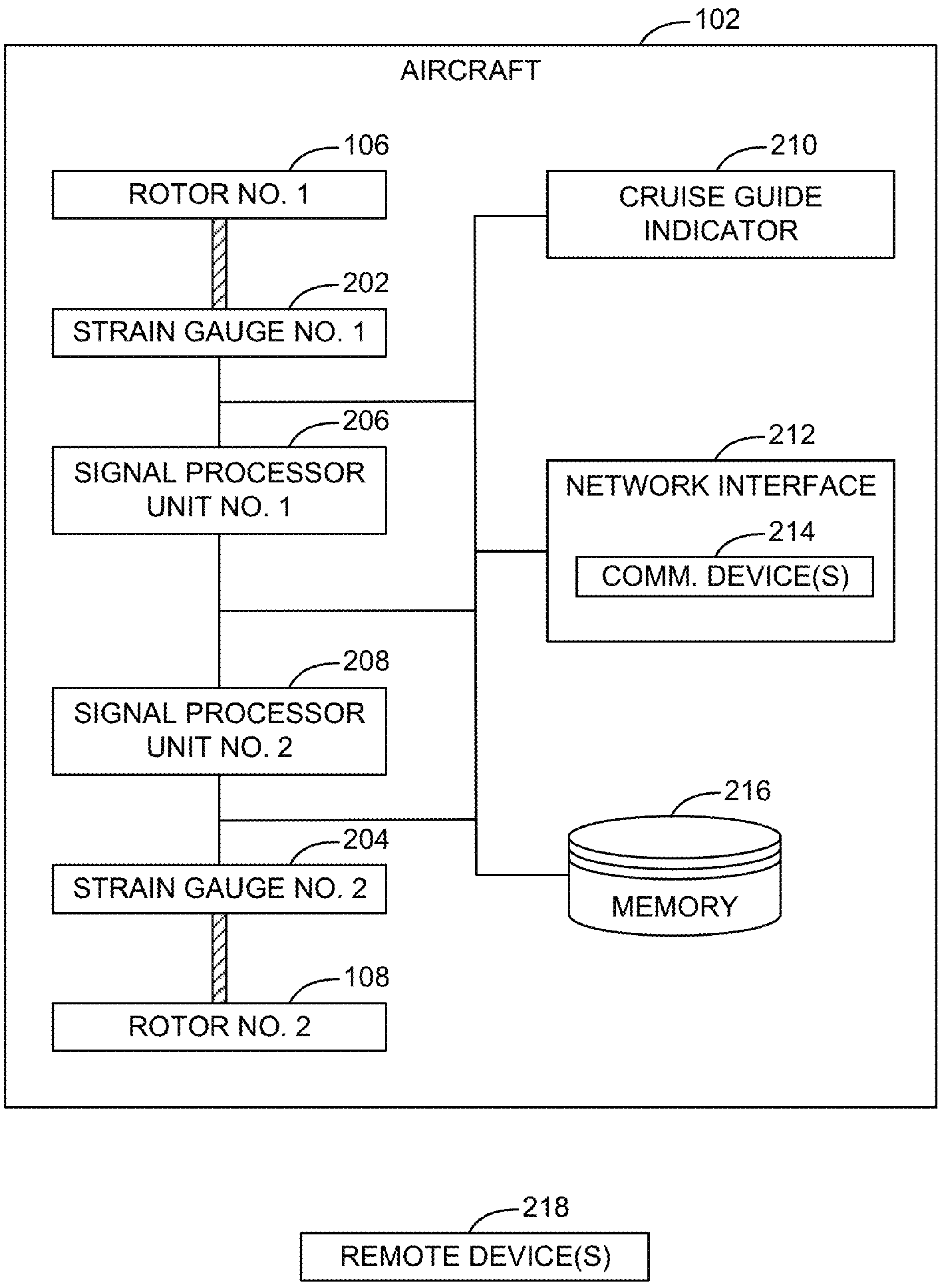
FIG. 2 is a block diagram illustrating certain components of the aircraft of FIG. 1.

FIG. 2 is a block diagram illustrating certain components of the aircraft 102 of FIG. 1. In the illustrated example of FIG. 2, the aircraft 102 includes the first rotor 106, the second rotor 108, a first strain gauge 202, a second strain gauge 204, a first signal processor unit 206, a second signal processor unit 208, a CGI 210, a network interface 212 (e.g., including one or more communication device(s) 214), and a memory 216. The aircraft 102 is configured to communicate (e.g., wirelessly communicate) with one or more example remote device(s) 218, as further described below.

The first strain gauge 202 of FIG. 2 is mechanically coupled to one or more component(s) of the first rotor 106 of the aircraft 102. The first strain gauge 202 senses, measures, and/or detects strain associated with one or more component(s) of the first rotor 106. Strain data sensed, measured, and/or detected by the first strain gauge 202 can be used to determine stress data associated with one or more component(s) of the first rotor 106, and/or to determine CGI signal data associated with the first rotor 106. Strain data sensed, measured, and/or detected by the first strain gauge 202 can be of any quantity, type, form, and/or format. In the illustrated example of FIG. 2, the first strain gauge 202 is in electrical communication with the first signal processor unit 206 and/or the memory 216 of the aircraft 102. Strain data sensed, measured, and/or detected by the first strain gauge 202 can be transmitted directly to the first signal processor unit 206 of FIG. 2, and/or can be transmitted to and stored in the memory 216 of FIG. 2.

The second strain gauge 204 of FIG. 2 is mechanically coupled to one or more component(s) of the second rotor 108 of the aircraft 102. The second strain gauge 204 senses, measures, and/or detects strain associated with one or more component(s) of the second rotor 108. Strain data sensed, measured, and/or detected by the second strain gauge 204 can be used to determine stress data associated with one or more component(s) of the second rotor 108, and/or to determine CGI signal data associated with the second rotor 108. Strain data sensed, measured, and/or detected by the second strain gauge 204 can be of any quantity, type, form, and/or format. In the illustrated example of FIG. 2, the second strain gauge 204 is in electrical communication with the second signal processor unit 208 and/or the memory 216 of the aircraft 102. Strain data sensed, measured, and/or detected by the second strain gauge 204 can be transmitted directly to the second signal processor unit 208 of FIG. 2, and/or can be transmitted to and stored in the memory 216 of FIG. 2.

The first signal processor unit 206 of FIG. 2 includes processor circuitry configured to generate and/or determine CGI signal data (e.g., a form of stress data) associated with the first rotor 106 based on the strain data sensed, measured and/or detected by the first strain gauge 202 of FIG. 2. CGI signal data generated and/or determined by the first signal processor unit 206 can be of any quantity, type, form, and/or format. In the illustrated example of FIG. 2, the first signal processor unit 206 is in electrical communication with the first strain gauge 202, the second signal processor unit 208, the CGI 210, the network interface 212, and/or the memory 216 of FIG. 2. CGI signal data generated and/or determined by the first signal processor unit 206 can be transmitted directly to the second signal processor unit 208 and/or the network interface 212 of FIG. 2, and/or can be transmitted to and stored in the memory 216 of FIG. 2.

The second signal processor unit 208 of FIG. 2 includes processor circuitry configured to generate and/or determine CGI signal data (e.g., a form of stress data) associated with the second rotor 108 based on the strain data sensed, measured and/or detected by the second strain gauge 204 of FIG. 2. CGI signal data generated and/or determined by the second signal processor unit 208 can be of any quantity, type, form, and/or format. In the illustrated example of FIG. 2, the second signal processor unit 208 is in electrical communication with the second strain gauge 204, the first signal processor unit 206, the CGI 210, the network interface 212, and/or the memory 216 of FIG. 2. CGI signal data generated and/or determined by the second signal processor unit 208 can be transmitted directly to the first signal processor unit 206 and/or the network interface 212 of FIG. 2, and/or can be transmitted to and stored in the memory 216 of FIG. 2.

The CGI 210 of FIG. 2 presents (e.g., displays) information corresponding to the CGI signal data generated and/or determined by the first signal processor unit 206 of FIG. 2, and/or corresponding to the CGI signal data generated and/or determined by the second signal processor unit 208 of FIG. 2. In some examples, the information presented by and/or at the CGI 210 corresponds to whichever one of the two CGI signal data sets (e.g., the CGI signal data generated and/or determined by the first processor unit 206 and the CGI signal data generated and/or determined by the second processor unit 208) has the greater CGI value (e.g., the greater stress value) at any given time. In other examples, the information presented by and/or at the CGI 210 corresponds to a composite of the two CGI signal data sets (e.g., the CGI signal data generated and/or determined by the first processor unit 206 and the CGI signal data generated and/or determined by the second processor unit 208) at any given time. In the illustrated example of FIG. 2, the CGI 210 is in electrical communication with the first signal processor unit 206, the second signal processor unit 208, the network interface 212, and/or the memory 216 of FIG. 2.

Figure 3:
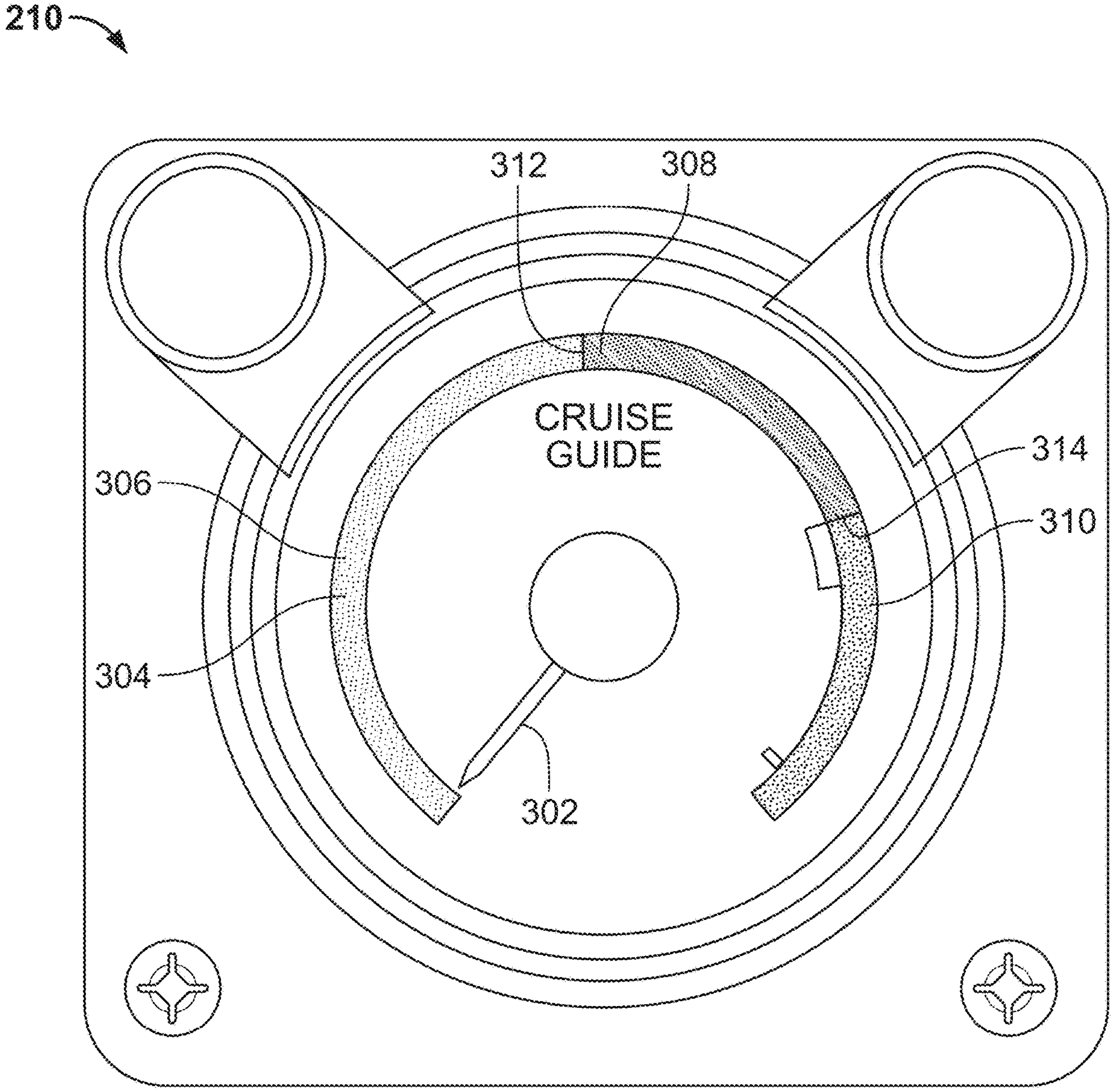
FIG. 3 is a front view of an example implementation of the CGI of FIG. 2.

The CGI 210 of FIG. 2 is typically located within a cockpit area of the aircraft 102. For example, the CGI 210 can be located on a control panel positioned within a cockpit area of the aircraft 102, such that the information presented by and/or at the CGI 210 is viewable to an operator (e.g., a pilot) of the aircraft 102. FIG. 3 is a front view of an example implementation of the CGI 210 of FIG. 2. In the illustrated example of FIG. 3, the CGI 210 includes an indication needle 302 and an indication dial 304, with the indication needle 302 being movable (e.g., rotatable) relative to the indication dial 304. The indication dial 304 includes a first band 306 (e.g., a normal band) corresponding to an acceptable CGI signal level (e.g., an acceptable level of rotor stress), a second band 308 (e.g., a transient band) corresponding to an undesirable CGI signal level (e.g., un undesirable level of rotor stress), and a third band 310 (e.g., an avoid band) corresponding to an unacceptable CGI signal level (e.g., an unacceptable level of rotor stress). The indication dial 304 further includes a first CGI crossing indicator 312 (e.g., a 100% CGI crossing indicator) corresponding to the transition between the first band 306 and the second band 308, and a second CGI crossing indicator 314 (e.g., a 150% CGI crossing indicator) corresponding to the transition between the second band 308 and the third band 310.

Movement of the indication needle 302 from the first band 306, past the first CGI crossing indicator 312, and into the second band 308 indicates that the first rotor 106 and/or the second rotor 108 of the aircraft 102 is/are experiencing undesirable stress that should preferably be reduced (e.g., via operator intervention during flight of the aircraft 102) such that the indication needle 302 crosses back over (e.g., drops below) the first CGI crossing indicator 312 and returns to the first band 306. Movement of the indication needle 302 from the second band 308, past the second CGI crossing indicator 314, and into the third band 310 indicates that the first rotor 106 and/or the second rotor 108 of the aircraft 102 is/are experiencing unacceptable stress that must immediately be reduced (e.g., via operator intervention during flight of the aircraft 102) such that the indication needle 302 at least crosses back over (e.g., drops below) the second CGI crossing indicator 314 and returns to the second band 308, and more preferably also crosses back over (e.g., drops below) the first CGI crossing indicator 312 and returns to the first band 306.

Returning to the illustrated example of FIG. 2, the network interface 212 of FIG. 2 includes one or more communication device(s) 214 (e.g., transmitter(s), receiver(s), transceiver(s), modem(s), gateway(s), wireless access point(s), etc.) to facilitate exchange of data with external machines (e.g., computing devices of any kind, including the ground station 104 of FIG. 1 and/or the remote device(s) 218 of FIG. 2) by a communication network (e.g., a wireless communication network). Communications transmitted and/or received via the communication device(s) 214 and/or, more generally, via the network interface 212 can be made over and/or carried by, for example, a satellite system, a wireless system, a cellular telephone system, etc. In the illustrated example of FIG. 2, the network interface 212 is in electrical communication with the first signal processor unit 206, the second signal processor unit 208, the CGI 210, and/or the memory 216 of FIG. 2.

The memory 216 of FIG. 2 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). In some examples, the memory 216 is implemented by and/or as part of a Flight Data Recorder (FDR) of the aircraft 102. The information and/or data stored in the memory 216 of FIG. 2 can be stored in any file and/or data structure format, organization scheme, and/or arrangement.

The memory 216 of FIG. 2 stores information and/or data (e.g., strain data, stress data, CGI signal data, etc.) sensed, measured, detected, generated, determined, identified, presented, input, output, transmitted, and/or received by, to, and/or from the first strain gauge 202, the second strain gauge 204, the first signal processor unit 206, the second signal processor unit 208, the CGI 210, and/or the network interface 212 of the aircraft 102. The memory 216 of FIG. 2 is accessible to one or more of the first strain gauge 202, the second strain gauge 204, the first signal processor unit 206, the second signal processor unit 208, the CGI 210, and/or the network interface 212 of FIG. 2.

The remote device(s) 218 of FIG. 2 can be included and/or can be implemented by a ground station (e.g., the ground station 104 of FIG. 1), a workstation, a personal computer, a server, a self-learning machine (e.g., a neural network), a mobile device (e.g., a cell phone, a smart phone, a tablet), a personal digital assistant (PDA), an Internet appliance, or any other type of computing device. The remote device(s) 218 include(s) a network interface, a memory, and/or processor circuitry respectively configured to receive information and/or data communicated (e.g., transmitted or otherwise transferred) from the aircraft 102, to store such information and/or data, and to evaluate and/or process such data.

Returning to the illustrated example of FIG. 1, the ground station 104 includes and/or is implemented by one or more computing device(s) having a network interface, a memory, and/or processor circuitry respectively configured to receive information and/or data communicated (e.g., transmitted or otherwise transferred) from the aircraft 102, to store such information and/or data, and to evaluate and/or process such data. For example, the ground station 104 of FIG. 1 can include and/or can be implemented by a network interface configured to receive CGI signal data communicated (e.g., transmitted or otherwise transferred) from the aircraft 102, a memory configured to store the CGI signal data, and processor circuitry configured to evaluate and/or process the CGI signal data. CGI signal data generated by and/or at the aircraft 102 of FIG. 1 can accordingly be communicated (e.g., transmitted or otherwise transferred) to the ground station 104 of FIG. 1, with the ground station 104 storing, evaluating, and/or processing the received CGI signal data.

CGI signal data can include one or more spike(s) (e.g., one or more sharp increase(s) in magnitude). In some instances, the CGI signal data includes an airload-driven spike corresponding to a sharp increase in the level of stress experienced by one or more component(s) of one or more rotor(s) of an aircraft (e.g., one or more component(s) of the first rotor 106 or the second rotor 108 of the aircraft 102 of FIG. 1) as a result of aerodynamic forces applied to the component(s) of the rotor(s) (e.g., during flight of the aircraft 102). The identification and evaluation of airload-driven spikes in CGI signal data can inform decisions with regard to whether one or more component(s) of the rotor(s) of the aircraft need to be repaired, replaced, and/or otherwise serviced.

Figure 4:
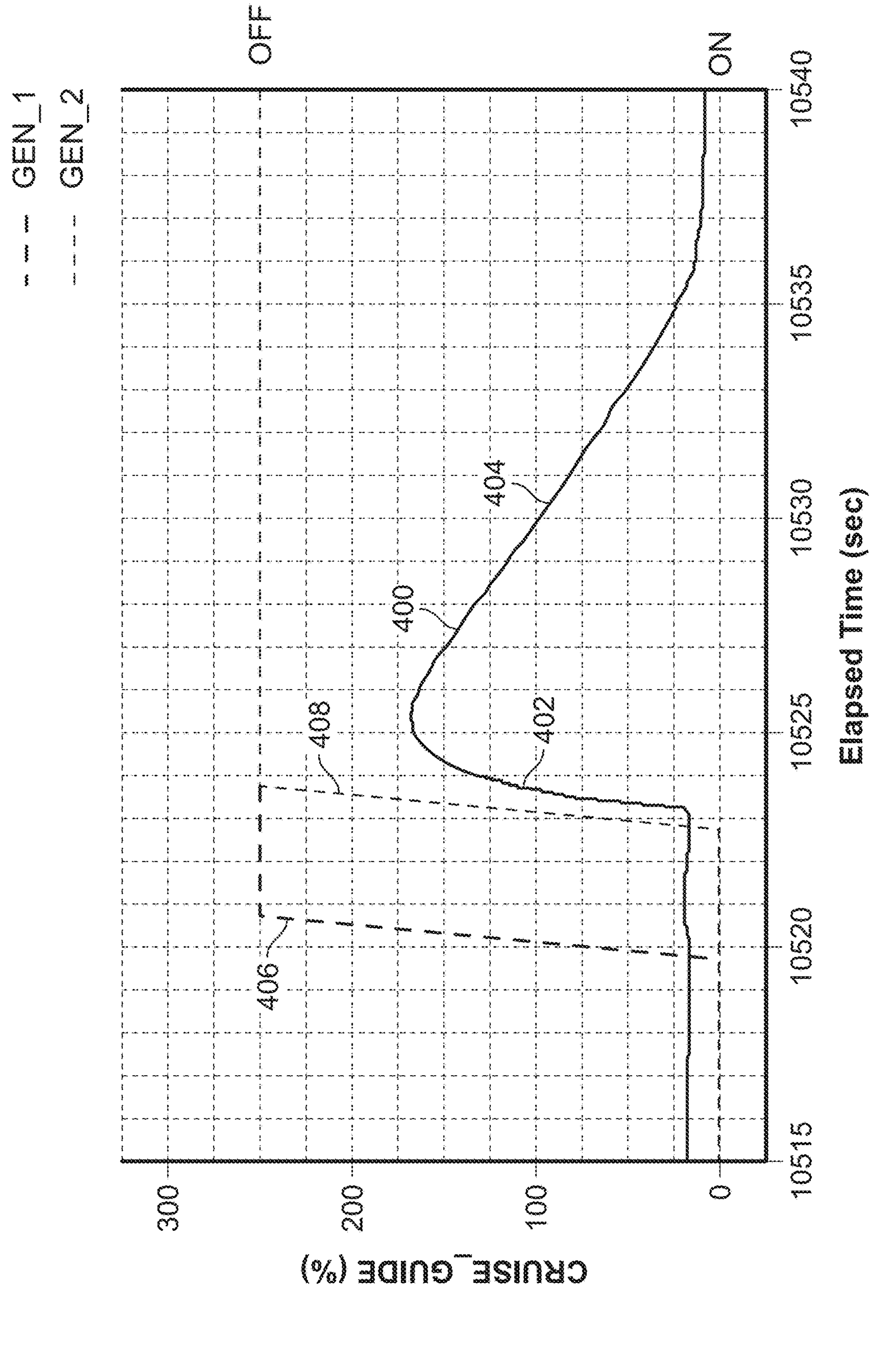
FIG. 4 is a graphical representation of example CGI signal data including an example artificial spike and an example transient response associated with the artificial spike.

In other instances, the CGI signal data includes an artificial spike which, unlike an airload-driven spike, has effectively no relation to the level of stress experienced by the component(s) of the rotor(s) of the aircraft. An artificial spike can be present in the CGI signal data, for example, as a result of electrical load switching associated with one or more electrical component(s) of the aircraft. An artificial CGI spike typically includes an associated transient response (e.g., a gradual decrease and/or decay in magnitude) extending from an unrealistic peak CGI value to a valid CGI value over a duration of time that is greater than ten seconds. FIG. 4 is a graphical representation of example CGI signal data 400 including an example artificial spike 402 and an example transient response 404 associated with the artificial spike 402. As shown in FIG. 4, the artificial spike 402 starts at a time of approximately t=10523 seconds, and reaches a peak at a time of approximately t=10525 seconds. As further shown in FIG. 4, the transient response 404 associated with the artificial spike 402 ends at a time of approximately t=10537 seconds. In the illustrated example of FIG. 4, the artificial spike 402 in the CGI signal data 400 is generated as a result of switching a first example electrical load 406 and a second example electrical load 408 from an "ON" state to an "OFF" state.

Figure 5:
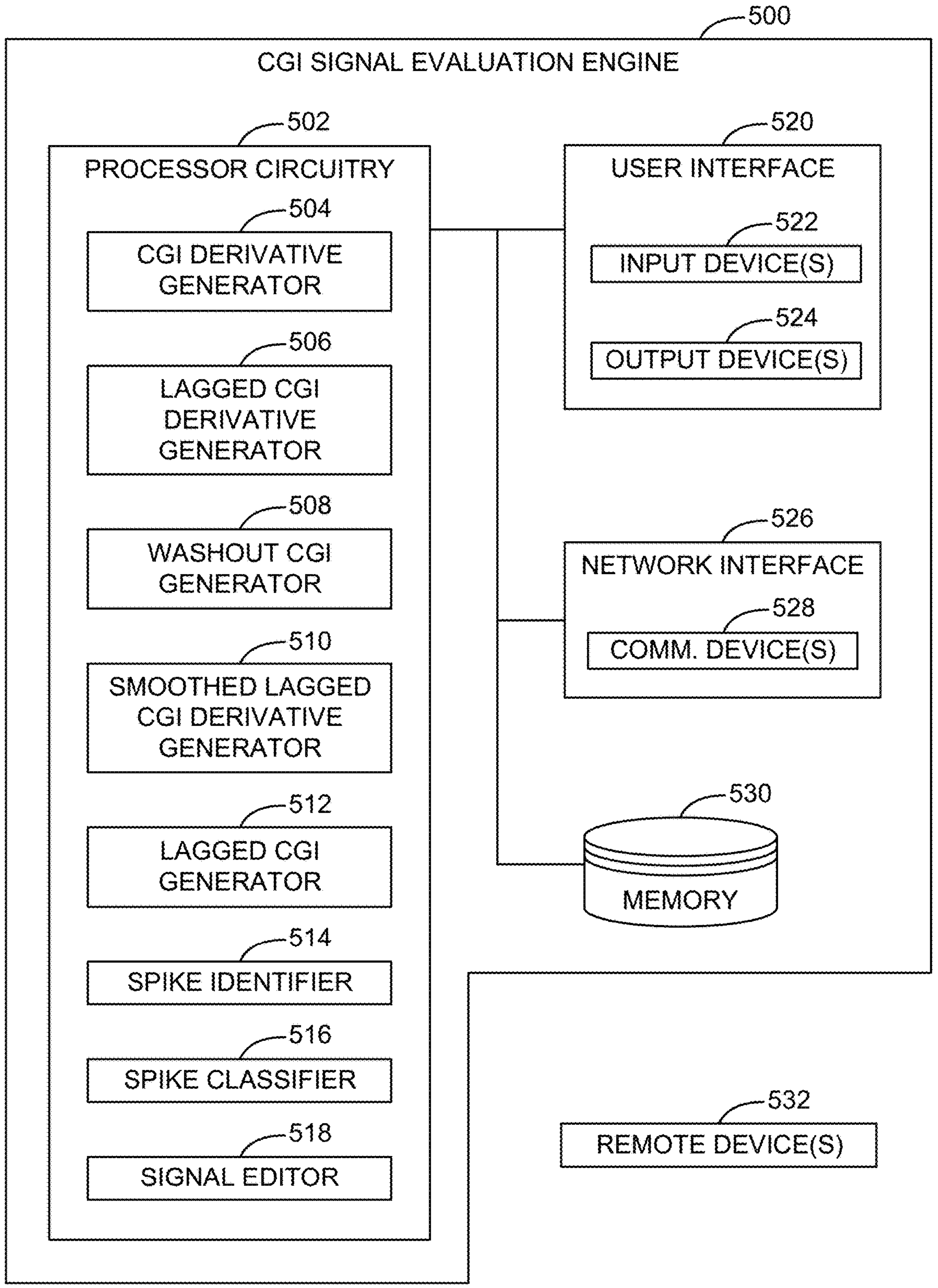
FIG. 5 is a block diagram of an example CGI signal evaluation engine constructed in accordance with the teachings of this disclosure.

FIG. 5 is a block diagram of an example CGI signal evaluation engine 500 constructed in accordance with the teachings of this disclosure. In some examples, the CGI signal evaluation engine 500 is included in and/or is implemented by and/or at a ground station (e.g., the ground station 104 of FIG. 1). In other examples, the CGI signal evaluation engine 500 of FIG. 5 is included in and/or is implemented by and/or at one or more computing device(s) located remotely from an aircraft (e.g., the remote device(s) 218 of FIG. 2). In still other examples, the CGI signal evaluation engine 500 of FIG. 5 is included in and/or is implemented by and/or at one or more computing device(s) located onboard an aircraft (e.g., onboard the aircraft 102 of FIG. 1).

The CGI signal evaluation engine 500 of FIG. 5 is configured to identify, classify, and edit artificial spikes in CGI signal data. In the illustrated example of FIG. 5, the CGI signal evaluation engine 500 includes example processor circuitry 502 (e.g., including an example CGI derivative generator 504, an example lagged CGI derivative generator 506, an example washout CGI generator 508, an example smoothed lagged CGI derivative generator 510, an example lagged CGI generator 512, an example spike identifier 514, an example spike classifier 516, and an example signal editor 518), an example user interface 520 (e.g., including one or more example input device(s) 522 and one or more example output device(s) 524), an example network interface 526 (e.g., including one or more example communication device(s) 528), and an example memory 530. The CGI signal evaluation engine 500 of FIG. 5 is configured to communicate (e.g., wirelessly communicate) with one or more example remote device(s) 532, as further described below.

The processor circuitry 502 of FIG. 5 manages, controls, performs, and/or implements one or more operation(s), program(s), and/or process(es) associated with identifying, classifying, and editing artificial spikes in CGI signal data. In this regard, the processor circuitry 502 of FIG. 5 can include (i) one or more special purpose electrical circuits structured to perform specific operations and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). In the illustrated example of FIG. 5, the processor circuitry 502 is in electrical communication with the user interface 520, the network interface 526, and/or the memory 530 of FIG. 5.

In the illustrated example of FIG. 5, the processor circuitry 502 includes the CGI derivative generator 504, the lagged CGI derivative generator 506, the washout CGI generator 508, the smoothed lagged CGI derivative generator 510, the lagged CGI generator 512, the spike identifier 514, the spike classifier 516, and the signal editor 518, each of which is further described below. Although the CGI derivative generator 504, the lagged CGI derivative generator 506, the washout CGI generator 508, the smoothed lagged CGI derivative generator 510, the lagged CGI generator 512, the spike identifier 514, the spike classifier 516, and the signal editor 518 of the processor circuitry 502 are graphically represented in FIG. 5 as being discrete structures and/or components of the processor circuitry 502, it is to be understood that one or more of the CGI derivative generator 504, the lagged CGI derivative generator 506, the washout CGI generator 508, the smoothed lagged CGI derivative generator 510, the lagged CGI generator 512, the spike identifier 514, the spike classifier 516, and the signal editor 518 can instead be combined into a single structure and/or component of the processor circuitry 502, and/or that one or more of the CGI derivative generator 504, the lagged CGI derivative generator 506, the washout CGI generator 508, the smoothed lagged CGI derivative generator 510, the lagged CGI generator 512, the spike identifier 514, the spike classifier 516, and the signal editor 518 can instead be further divided into one or more additional discrete structure (s) and/or component(s) of the processor circuitry 502.

The CGI derivative generator 504 of FIG. 5 generates a CGI derivative signal (e.g., CGI derivative signal data) based on the CGI signal (e.g., CGI signal data received via the network interface 526 of FIG. 5 and/or stored via the memory 530 of FIG. 5). The CGI derivative signal is determined and/or calculated as a time rate-of-change of the CGI signal. In some examples, the CGI derivative generator 504 implements Forward Difference differentiation, Central Difference differentiation, and Backward Difference differentiation to compute and/or calculate the time derivative of the CGI signal. Forward Difference differentiation is used at the start time (t=0). Backward Difference differentiation is used at the end time (tend). Central Difference differentiation is used for time between the start time and the end time (0<t<tend). Equations implemented by the CGI derivative generator 504 to compute and/or calculate the Forward Difference, Central Difference, and Backward Difference are provided below, with "t" representing time, "h" representing a time increment, "CGI" representing the value (e.g., the amplitude) of the CGI signal, and "CGI'" representing the value (e.g., the amplitude) of the CGI derivative signal.

$$\text{Forward Difference } (t=0)\text{: } CGI'(t)(CGI(t+h)-CGI(t))/h$$

$$\text{Central Difference } (0<t<\text{tend})\text{: } CGI'(t)(CGI(t+h)-CGI(t-h))/2h$$

$$\text{Backward Difference } (t=\text{tend})\text{: } CGI'(t)(CGI(t)-CGI(t-h))/h$$

The output of the above-described equation(s) constitutes the CGI derivative signal computed, calculated, and/or generated by the CGI derivative generator 504.

CGI derivative signal data generated by the CGI derivative generator 504 of FIG. 5 can be of any quantity, type, form, and/or format. CGI derivative signal data generated by the CGI derivative generator 504 can be transmitted directly to one or more other component(s) of the processor circuitry 502 of FIG. 5, and/or can be transmitted to and stored in the memory 530 of FIG. 5.

The lagged CGI derivative generator 506 of FIG. 5 generates a lagged CGI derivative signal (e.g., lagged CGI derivative signal data) based on the CGI signal (e.g., CGI signal data received via the network interface 526 of FIG. 5 and/or stored via the memory 530 of FIG. 5). In some examples, the lagged CGI derivative generator 506 computes and/or calculates a first order lag filter for the CGI signal based on the equation provided below.

| | | |
|---|---|---|
| Inputs: | $XIN$ | $= CGI$ input value |
| | time frame | = 0.125 sec |
| | time constant | = 0.5 sec |
| | ALPHA | = EXP (−(time frame)/(time constant)) |
| | $YOUT$ | $= CGI$ value of lag output at beginning of time step |
| Output: | $YOUT$ | $= CGI$ value of lag output at end of time step |
| Equation: | $YOUT$ | $= XIN + \text{ALPHA} * (YOUT - XIN)$ |

The above-described difference equation for the first order lag filter is commonly referred to (e.g., in the art of digital signal processing) as the rectangular lag filter algorithm.

Once the lagged CGI derivative generator 506 has computed and/or calculated the first order lag filter for the CGI signal, the lagged CGI derivative generator 506 then implements and/or performs Central Difference differentiation (e.g., as discussed above in connection with the CGI derivative generator 504 of FIG. 5) on YOUT to compute, calculate, and/or generate the lagged CGI derivate signal.

Lagged CGI derivative signal data generated by the lagged CGI derivative generator 506 of FIG. 5 can be of any quantity, type, form, and/or format. Lagged CGI derivative signal data generated by the lagged CGI derivative generator 506 can be transmitted directly to one or more other component(s) of the processor circuitry 502 of FIG. 5, and/or can be transmitted to and stored in the memory 530 of FIG. 5.

The washout CGI generator 508 of FIG. 5 generates a washout CGI signal (e.g., washout CGI signal data) based on the CGI signal (e.g., CGI signal data received via the network interface 526 of FIG. 5 and/or stored via the memory 530 of FIG. 5). In some examples, the washout CGI generator 508 computes and/or calculates a washout filter for the CGI signal based on the equations provided below.

| | | |
|---|---|---|
| Inputs: | $XIN$ | = $CGI$ input value |
| | time frame | = 0.125 sec |
| | time constant | = 1.0 sec |
| | ALPHA | = EXP (−(time frame)/(time constant)) |
| Output: | $WSHP$ | = $CGI$ value of washout at beginning of time step |
| | $SN3$ | = stores previous value of input |
| | $WSHP$ | = $CGI$ value of washout at end of time step |
| Equation: | $SN1$ | = ALPHA |
| | $SN2$ | $= (0.1 + SN1) * 0.5$ |
| | $WSHP$ | $= SN1 * WSHP + SN2 * (XIN - SN3)$ |
| | $SN3$ | $= XIN$ |

The above-described equation(s) for the washout filter is/are commonly referred to (e.g., in the art of digital signal processing) as the Tustin approximation washout filter algorithm, or as the Tustin approximation high pass filter algorithm. The output of the above-described equation(s) constitutes the washout CGI signal computed, calculated, and/or generated by the washout CGI generator 508.

Washout CGI signal data generated by the washout CGI generator 508 of FIG. 5 can be of any quantity, type, form, and/or format. Washout CGI signal data generated by the washout CGI generator 508 can be transmitted directly to one or more other component(s) of the processor circuitry 502 of FIG. 5, and/or can be transmitted to and stored in the memory 530 of FIG. 5.

The smoothed lagged CGI derivative generator 510 of FIG. 5 generates a smoothed lagged CGI derivative signal (e.g., smooth lagged CGI derivative signal data) based on the CGI signal (e.g., CGI signal data received via the network interface 526 of FIG. 5 and/or stored via the memory 530 of FIG. 5). In some examples, the smoothed lagged CGI derivative generator 510 computes and/or calculates a first order lag filter for the CGI signal based on the equation provided below.

| | | |
|---|---|---|
| Inputs: | $XIN$ | = $CGI$ input value |
| | time frame | = 0.125 sec |
| | time constant | = 0.5 sec |
| | ALPHA | = EXP (−(time frame)/(time constant)) |
| | $YOUT$ | = $CGI$ value of lag output at beginning of time step |
| Output: | $YOUT$ | = $CGI$ value of lag output at end of time step |
| Equation: | $YOUT$ | $= XIN + \text{ALPHA} * (YOUT - XIN)$ |

The above-described difference equation for the first order lag filter is commonly referred to (e.g., in the art of digital signal processing) as the rectangular lag filter algorithm.

Once the smoothed lagged CGI derivative generator 510 has computed and/or calculated the first order lag filter for the CGI signal, the smoothed lagged CGI derivative generator 510 then implements and/or performs Central Difference differentiation (e.g., as discussed above in connection with the CGI derivative generator 504 of FIG. 5) on YOUT to compute and/or calculate a lagged CGI derivate signal. Once the smoothed lagged CGI derivative generator 510 has computed and/or calculated the lagged CGI derivative signal, the smoothed lagged CGI derivative generator 510 then implements and/or applies a binomial smoothing filter (e.g., a Gaussian filter) to compute, calculate, and/or generate a smoothed lagged CGI derivative signal. In other examples, a different type of smoothing filter that reduces high frequency noise can be implemented and/or applied by the smoothed lagged CGI derivative generator 510 to compute, calculate, and/or generate a smoothed lagged CGI derivative signal. Such other types of smoothing filters can include, for example, first order lag and higher order low-pass filters, Butterworth filters, Least-Squares Polynomial (LSP) smoothing filters, etc.

Smoothed lagged CGI derivative signal data generated by the smoothed lagged CGI derivative generator 510 of FIG. 5 can be of any quantity, type, form, and/or format. Smoothed lagged CGI derivative signal data generated by the smoothed lagged CGI derivative generator 510 can be transmitted directly to one or more other component(s) of the processor circuitry 502 of FIG. 5, and/or can be transmitted to and stored in the memory 530 of FIG. 5.

The lagged CGI generator 512 of FIG. 5 generates a lagged CGI signal (e.g., lagged CGI signal data) based on the CGI signal (e.g., CGI signal data received via the network interface 526 of FIG. 5 and/or stored via the memory 530 of FIG. 5). In some examples, the lagged CGI generator 512 computes and/or calculates a first order lag filter for the CGI signal based on the equation provided below.

| | | |
|---|---|---|
| Inputs: | $XIN$ | = $CGI$ input value |
| | time frame | = 0.125 sec |
| | time constant | = 0.5 sec |
| | ALPHA | = EXP (−(time frame)/(time constant)) |
| | $YOUT$ | = $CGI$ value of lag output at beginning of time step |
| Output: | $YOUT$ | = $CGI$ value of lag output at end of time step |
| Equation: | $YOUT$ | $= XIN + \text{ALPHA} * (YOUT - XIN)$ |

The above-described equation for the first order lag filter is commonly referred to (e.g., in the art of digital signal processing) as the rectangular lag filter algorithm. The output of the above-described equation constitutes the lagged CGI signal computed, calculated, and/or generated by the lagged CGI generator 512.

Lagged CGI signal data generated by the lagged CGI generator 512 of FIG. 5 can be of any quantity, type, form, and/or format. Lagged CGI signal data generated by the lagged CGI generator 512 can be transmitted directly to one or more other component(s) of the processor circuitry 502 of FIG. 5, and/or can be transmitted to and stored in the memory 530 of FIG. 5.

The spike identifier 514 of FIG. 5 determines whether the CGI signal data includes a spike. In some examples, the spike identifier 514 evaluates and/or utilizes a CGI derivative signal (e.g., CGI derivative signal data) generated by the CGI derivative generator 504 of FIG. 5, a lagged CGI derivative signal (e.g., lagged CGI derivative signal data) generated by the lagged CGI derivative generator 506 of FIG. 5, and a washout CGI signal (e.g., washout CGI signal data) generated by the washout CGI generator 508 of FIG. 5 to determine whether the CGI signal data includes a spike. The spike identifier 514 identifies and/or determines a peak (e.g., a maximum amplitude) of the CGI derivative signal, a peak (e.g., a maximum amplitude) of the lagged CGI derivative signal, and a peak (e.g., a maximum amplitude) of the washout CGI signal. Once the spike identifier 514 has identified and/or determined the respective signal peaks, the spike identifier 514 compares each signal peak to a corresponding signal threshold. For example, the spike identifier 514 compares the CGI derivative peak to a CGI derivative threshold, compares the lagged CGI derivative peak to a lagged CGI derivative threshold, and compares the washout CGI peak to a washout CGI threshold. The aforementioned thresholds are empirically-developed criteria and/or constants configured to facilitate the identification of one or more spike(s) in CGI signal data.

The spike identifier 514 of FIG. 5 determines that the CGI signal data includes a spike when each signal peak is greater than its corresponding signal threshold (e.g., when the CGI derivative peak is greater than the CGI derivative threshold, the lagged CGI derivative peak is greater than the lagged CGI derivative threshold, and the washout CGI peak is greater than the washout CGI threshold). Conversely, the spike identifier 514 determines that the CGI signal data does not include a spike when any one of the respective signal peaks is not greater than (e.g., is less than) its corresponding signal threshold (e.g., when the CGI derivative peak is not greater than the CGI derivative threshold, the lagged CGI derivative peak is not greater than the lagged CGI derivative threshold, or the washout CGI peak is not greater than the washout CGI threshold). The spike identifier 514 accordingly implements logic akin to that of an AND gate in the course of determining whether the CGI signal data includes a spike, with the applied criteria being that: (1) the CGI derivative peak must be greater than the CGI derivative threshold; (2) the lagged CGI derivative peak must be greater than the lagged CGI derivative threshold; and (3) the washout CGI peak must be greater than the washout CGI threshold.

Figure 6:
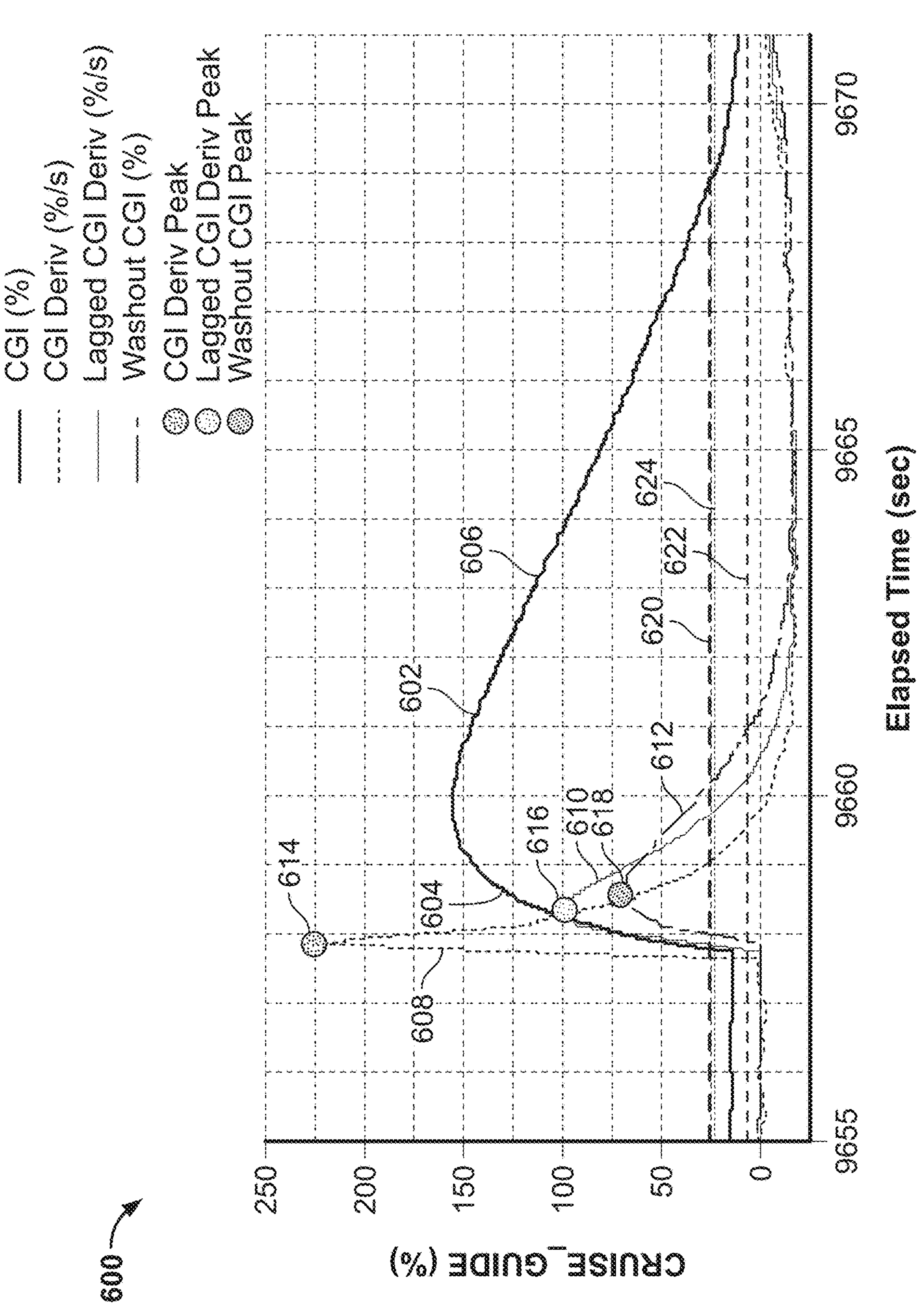
FIG. 6 is a graphical representation associated with the process of determining whether CGI signal data includes a spike.

FIG. 6 is a graphical representation associated with the process of determining whether CGI signal data includes a spike. The example graph 600 of FIG. 6 includes an example CGI signal 602 (e.g., CGI signal data) having an example artificial spike 604 and an example transient response 606 associated with the artificial spike 604. The graph 600 of FIG. 6 further includes an example CGI derivative signal 608 (e.g., CGI derivative signal data) generated by the CGI derivative generator 504 of FIG. 5 based on the CGI signal 602, an example lagged CGI derivative signal 610 (e.g., lagged CGI derivative signal data) generated by the lagged CGI derivative generator 506 of FIG. 5 based on the CGI signal 602, and an example washout CGI signal 612 (e.g., washout CGI signal data) generated by the washout CGI generator 508 of FIG. 5 based on the CGI signal 602. The graph 600 of FIG. 6 further includes identification points (e.g., identified and/or determined by the spike identifier 514 of FIG. 5) representing and/or corresponding to an example peak 614 of the CGI derivative signal 608, an example peak 616 of the lagged CGI derivative signal 610, and an example peak 618 of the washout CGI signal 612. The graph 600 of FIG. 6 further includes criteria lines (e.g., selected, invoked, implemented, and/or otherwise utilized by the spike identifier 514 of FIG. 5) representing and/or corresponding to an example CGI derivative threshold 620, an example lagged CGI derivative threshold 622, and an example washout CGI threshold 624. The criteria lines shown in FIG. 6 represent and/or correspond to empirically-developed thresholds, criteria, and/or constants configured to facilitate the identification of one or more spike(s) in CGI signal data.

In the illustrated example of FIG. 6, the spike identifier 514 of FIG. 5 determines that the CGI derivative peak 614 is greater than the CGI derivative threshold 620, that the lagged CGI derivative peak 616 is greater than the lagged CGI derivative threshold 622, and that the washout CGI peak 618 is greater than the washout CGI threshold 624. The spike identifier 514 accordingly determines (e.g., based on each signal peak being greater than its corresponding signal threshold) that the CGI signal 602 includes a spike. In other examples, it may instead be the case that the CGI derivative peak 614 is less than the CGI derivative threshold 620, that the lagged CGI derivative peak 616 is less than the lagged CGI derivative threshold 622, and/or that the washout CGI peak 618 is less than the washout CGI threshold 624. In such other examples, the spike identifier 514 accordingly determines (e.g., based one or more of the signal peak(s) being less than its corresponding signal threshold) that the CGI signal 602 does not include a spike.

Returning to the illustrated example of FIG. 5, the spike classifier 516 of FIG. 5 determines whether the spike (e.g., as identified by the spike identifier 514 of FIG. 5) is an artificial spike. In some examples, the spike classifier 516 evaluates and/or utilizes a lagged CGI derivative signal (e.g., lagged CGI derivative signal data) generated by the lagged CGI derivative generator 506 of FIG. 5 and/or a washout CGI signal (e.g., washout CGI signal data) generated by the washout CGI generator 508 of FIG. 5 to determine whether the spike is an artificial spike. The spike classifier 516 identifies and/or determines a CGI crossing point of the lagged CGI derivative signal. In some examples, the identified and/or determined CGI crossing point of the lagged CGI signal is a point of the lagged CGI derivative signal corresponding to the second CGI crossing indicator 314 (e.g., the 150% CGI crossing indicator) of the CGI 210 of FIGS. 2 and 3. The spike classifier 516 further identifies and/or determines a CGI crossing point of the washout CGI signal. In some examples, the identified and/or determined CGI crossing point of the washout CGI signal is a point of the washout CGI signal corresponding to the second CGI crossing indicator 314 (e.g., the 150% CGI crossing indicator) of the CGI 210 of FIGS. 2 and 3. The spike classifier 516 further identifies and/or determines a last valid CGI point of the CGI signal. In some examples, the last valid CGI point is identified as the point in time at which the value of the CGI signal transitions from a constant or near-constant value to an increasing positive value. Once the spike classifier 516 of FIG. 5 has identified and/or determined the CGI crossing point of the lagged CGI derivative signal, the CGI crossing point of the washout CGI signal, and the last valid CGI point, the spike classifier 516 compares the CGI crossing point of the lagged CGI derivative signal to a lagged CGI derivative threshold, compares the CGI crossing point of the washout CGI signal to a washout CGI threshold, and compares the last valid CGI point to a low CGI threshold. The aforementioned thresholds are empirically-developed criteria and/or constants configured to facilitate the unique classification of an identified spike as constituting an artificial spike.

The spike classifier 516 of FIG. 5 determines that the spike is an artificial spike when the CGI crossing point of the lagged CGI derivative signal is greater than the lagged CGI derivative threshold and/or the CGI crossing point of the washout CGI signal is greater than the washout CGI threshold, and the last valid CGI point of the CGI signal is less than the low CGI threshold. Conversely, the spike classifier 516 of FIG. 5 determines that the spike is not an artificial spike when the CGI crossing point of the lagged CGI derivative signal is not greater than (e.g., is less than) the lagged CGI derivative threshold and the CGI crossing point of the washout CGI signal is not greater than (e.g., is less than) the washout CGI threshold, or when the last valid CGI point of the CGI signal is not less than (e.g., is greater than) the low CGI threshold. The spike classifier 516 accordingly implements logic akin to that of an AND gate in the course of determining whether the spike is an artificial spike, with the applied criteria being that: (1) the CGI crossing point of the lagged CGI derivative signal must be greater than the lagged CGI derivative threshold and/or the CGI crossing point of the washout CGI signal must be greater than the washout CGI threshold; and (2) the last valid CGI point of the CGI signal must be less than the low CGI threshold.

In instances where the spike classifier 516 of FIG. 5 determines that a spike is an artificial spike, the signal editor 518 of FIG. 5 and/or, more generally, the CGI signal evaluation engine of FIG. 5 proceeds to modify, alter, and/or otherwise edit the CGI signal data, as further described below. In instances where the spike classifier 516 of FIG. 5 instead determines that a spike is not an artificial spike, the signal editor 518 of FIG. 5 and/or, more generally, the CGI signal evaluation engine of FIG. 5 refrains from modifying, altering, and/or otherwise editing the CGI signal data.

Figure 7:
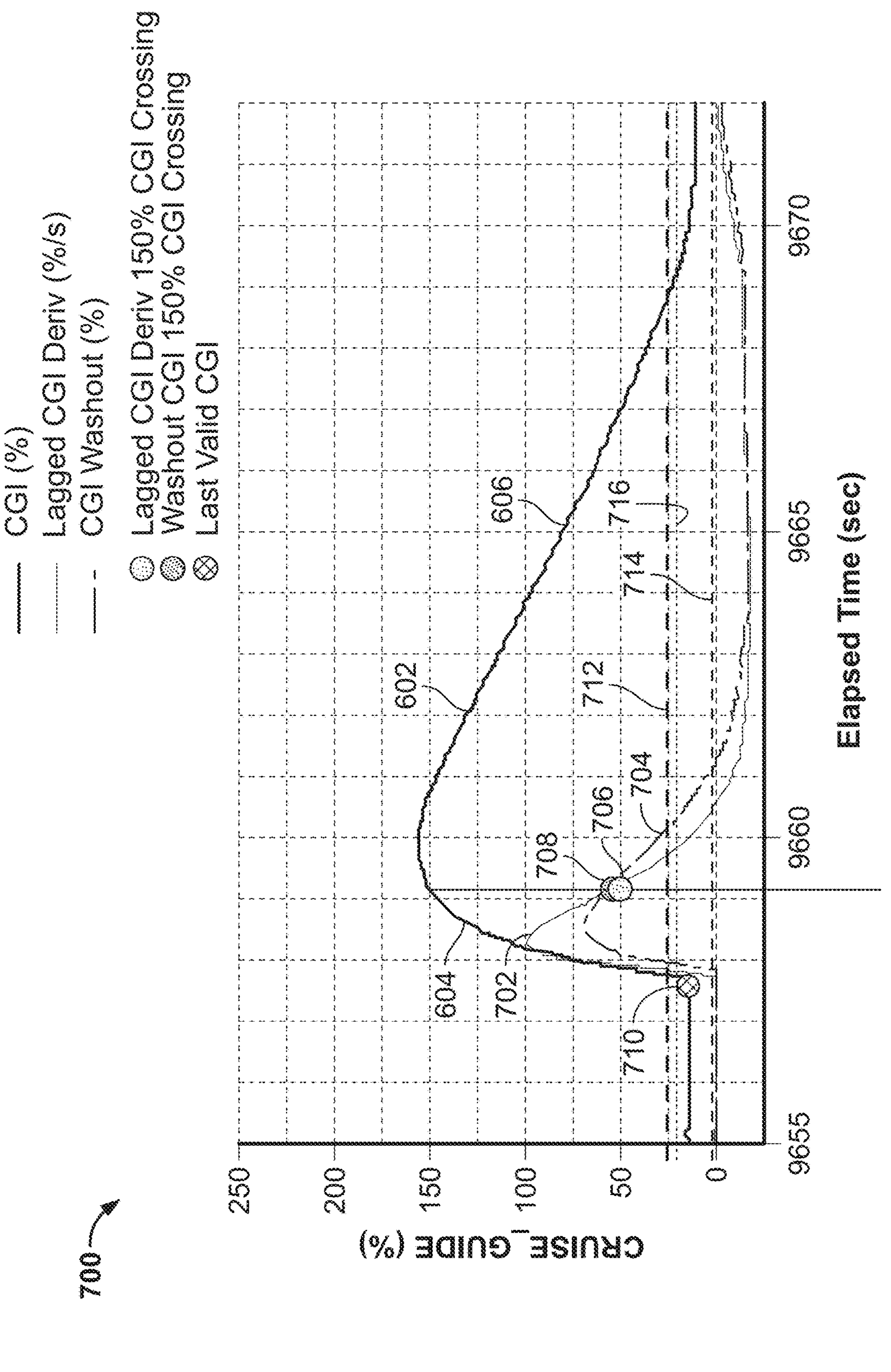
FIG. 7 is a graphical representation associated with the process of determining whether an identified spike is an artificial spike.

FIG. 7 is a graphical representation associated with the process of determining whether an identified spike is an artificial spike. The example graph 700 of FIG. 7 includes the CGI signal 602 (e.g., CGI signal data) of FIG. 6, and further includes an example lagged CGI derivative signal 702 (e.g., lagged CGI derivative signal data) generated by the lagged CGI derivative generator 506 of FIG. 5 based on the CGI signal 602, and an example washout CGI signal 704 (e.g., washout CGI signal data) generated by the washout CGI generator 508 of FIG. 5 based on the CGI signal 602. The graph 700 of FIG. 7 further includes identification points (e.g., identified and/or determined by the spike classifier 516 of FIG. 5) representing and/or corresponding to an example CGI crossing point 706 of the lagged CGI derivative signal 702, an example CGI crossing point 708 of the washout CGI signal 704, and an example last valid CGI point 710 of the CGI signal 602. The graph 700 of FIG. 7 further includes criteria lines (e.g., selected, invoked, implemented, and/or otherwise utilized by the spike classifier 516 of FIG. 5) representing and/or corresponding to an example lagged CGI derivative threshold 712, an example washout CGI threshold 714, and an example low CGI threshold 716. The criteria lines shown in FIG. 7 represent and/or correspond to empirically-developed thresholds, criteria, and/or constants configured to facilitate the unique classification of an identified spike as constituting an artificial spike.

In the illustrated example of FIG. 7, the spike classifier 516 of FIG. 5 determines that the CGI crossing point 706 of the lagged CGI derivative signal 702 is greater than the lagged CGI derivative threshold 712, that the CGI crossing point 708 of the washout CGI signal 704 is greater than the washout CGI threshold 714, and that the last valid CGI point 710 is less than the low CGI threshold 716. The spike classifier 516 accordingly determines that the spike (e.g., identified by the spike identifier 514 of FIG. 5) is an artificial spike. In such an example, the signal editor 518 of FIG. 5 and/or, more generally, the CGI signal evaluation engine of FIG. 5 proceeds to modify, alter, and/or otherwise edit the CGI signal data, as further described below. In other examples, it may instead be the case that the CGI crossing point 706 of the lagged CGI derivative signal 702 is not greater than (e.g., is less than) the lagged CGI derivative threshold 712 and that the CGI crossing point 708 of the washout CGI signal 704 is not greater than (e.g., is less than) the washout CGI threshold 714, and/or that the last valid CGI point 710 is not less than (e.g., is greater than) the low CGI threshold 716. In such other examples, the spike classifier 516 accordingly determines that the spike (e.g., identified by the spike identifier 514 of FIG. 5) is not an artificial spike. In such other examples, the signal editor 518 of FIG. 5 and/or, more generally, the CGI signal evaluation engine of FIG. 5 refrains from modifying, altering, and/or otherwise editing the CGI signal data.

Returning to the illustrated example of FIG. 5, the signal editor 518 replaces the portion of the CGI signal data including the artificial spike and a transient response of the artificial spike with edited CGI signal data. The signal editor 518 performs multiple operations to facilitate the replacement and/or editing of the CGI signal data, including: (1) identifying and/or determining a start time associated with the artificial spike of the CGI signal data; (2) identifying and/or determining an end time associated with a transient response of the artificial spike of the CGI signal data; (3) removing a portion of the CGI signal data extending from the start time of the artificial spike to the end time of the transient response of the artificial spike; and (4) replacing the removed portion of the CGI signal data with edited CGI signal data corresponding to a last valid CGI point of the CGI signal data. Each of the aforementioned operations of the signal editor 518 is further described below.

The signal editor 518 of FIG. 5 identifies and/or determines a start time associated with the artificial spike (e.g., as classified by the spike classifier 516 of FIG. 5) of the CGI signal data. In some examples, the signal editor 518 evaluates and/or utilizes a CGI derivative signal (e.g., CGI derivative signal data) generated by the CGI derivative generator 504 of FIG. 5 to identify and/or determine a start time associated with the artificial spike. In connection with identifying and/or determining the start time, the signal editor 518 identifies and/or determines a point in time at which the value of the CGI derivative signal transitions from a zero (or near-zero) value to an increasing positive value. The signal editor 518 identifies the transition point of the CGI derivative signal as the start time of the artificial spike of the CGI signal data.

Figure 8:
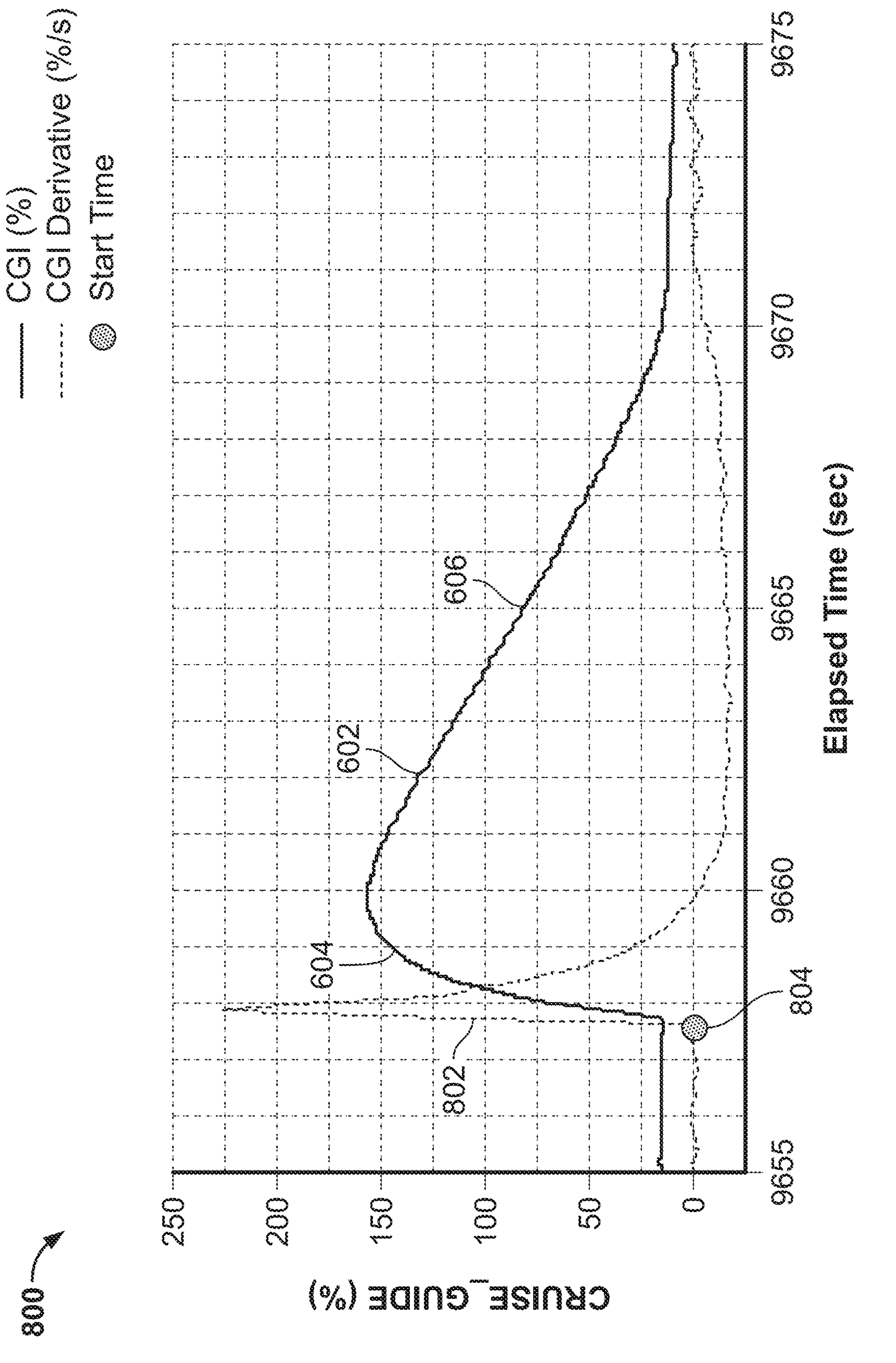
FIG. 8 is a graphical representation associated with the process of identifying a start time of an artificial spike.

FIG. 8 is a graphical representation associated with the process of identifying and/or determining a start time of an artificial spike. The example graph 800 of FIG. 8 includes the CGI signal 602 (e.g., CGI signal data) of FIGS. 6 and 7, and further includes an example CGI derivative signal 802 (e.g., CGI derivative signal data) generated by the CGI derivative generator 504 of FIG. 5 based on the CGI signal 602. The graph 800 of FIG. 8 further includes an identification point (e.g., identified and/or determined by the signal editor 518 of FIG. 5) representing and/or corresponding to an example start time 804 of the artificial spike 604 of the CGI signal 602. In the illustrated example of FIG. 8, the signal editor 518 has identified and/or determined a point in time at which the value of the CGI derivative signal 802 transitions from a zero (or near-zero) value to an increasing positive value (e.g., approximately t=9657.7 seconds as shown in FIG. 8), and has identified the transition point of the CGI derivative signal 802 as the start time 804 of the artificial spike 604 of the CGI signal 602.

Returning to the illustrated example of FIG. 5, the signal editor 518 of identifies and/or determines an end time associated with a transient response of the artificial spike (e.g., as classified by the spike classifier 516 of FIG. 5) of the CGI signal data. In some examples, the signal editor 518 evaluates and/or utilizes a smoothed lagged CGI derivative signal (e.g., smoothed lagged CGI derivative signal data) generated by the smoothed lagged CGI derivative generator 510 of FIG. 5, and a lagged CGI signal (e.g., lagged CGI signal data) generated by the lagged CGI generator 512 of FIG. 5 to identify and/or determine an end time associated with the transient response of the artificial spike.

In connection with identifying and/or determining the end time, the signal editor 518 identifies and/or determines a convergence starting point of the smoothed lagged CGI derivative signal. In some examples, the success of using the smoothed lagged CGI derivative signal is dependent on starting the convergence after the smoothed lagged CGI derivative signal has crossed a zero value on the downslope after the smoothed lagged CGI derivative signal peak. The lagged CGI signal is used to ensure convergence begins after the zero value has been crossed on the downslope after the smoothed lagged CGI derivative signal peak. In some examples, the convergence starting point of the smoothed lagged CGI derivative signal is identified as a point in time that is a threshold number of time frames (e.g., at least two time frames) subsequent to a time associated with an identified peak of the lagged CGI signal.

Once the convergence starting point has been identified and/or determined, the signal editor 518 identifies and/or determines a point in time, subsequent to the convergence starting point, at which the value of the smoothed lagged CGI derivative signal returns to a zero (or near-zero) value. The signal editor 518 identifies the return point of the smoothed lagged CGI derivative signal as the end time of the transient response of the artificial spike of the CGI signal data.

Figure 9:
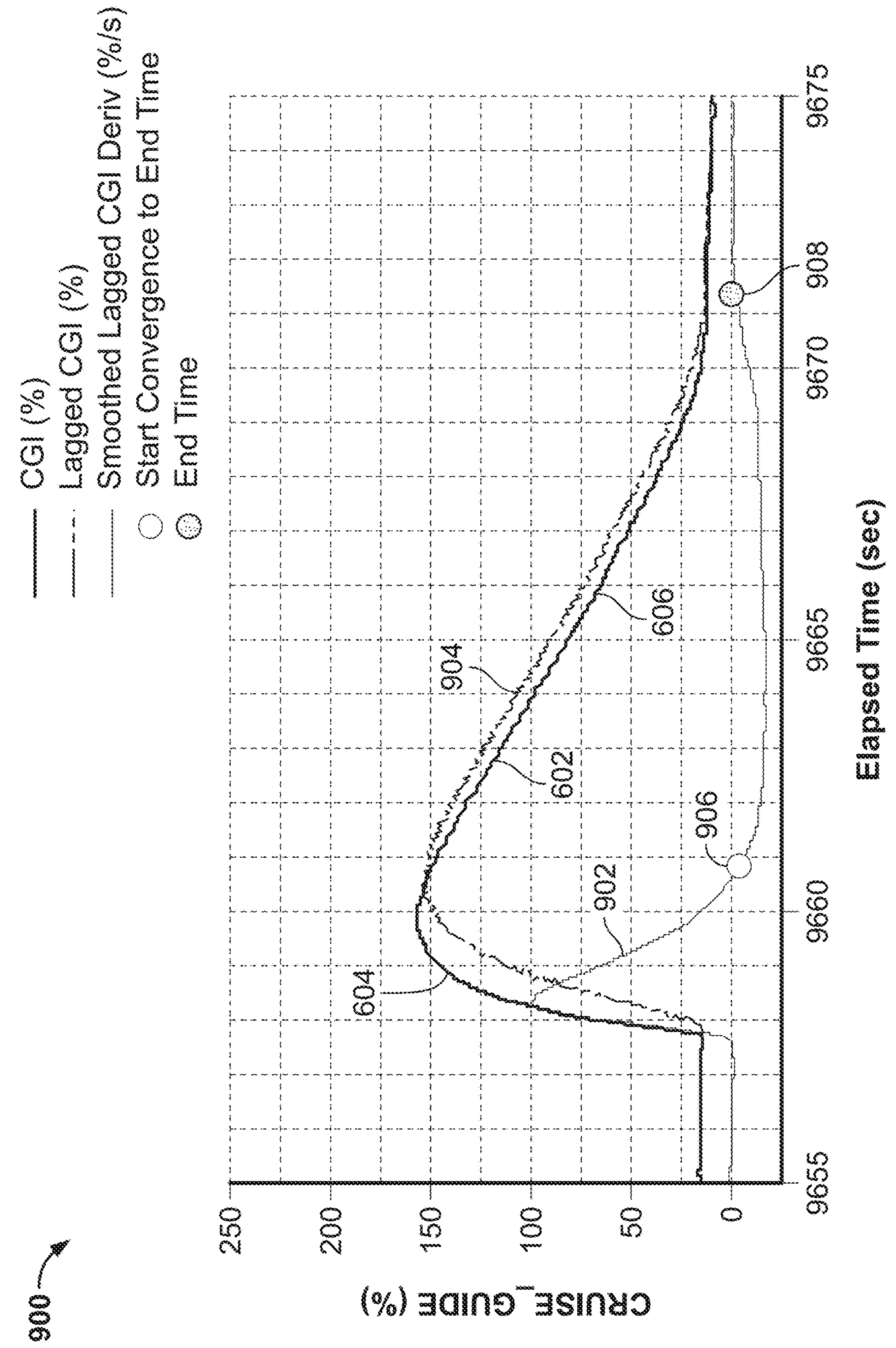
FIG. 9 is a graphical representation associated with the process of identifying an end time of a transient response of an artificial spike.

FIG. 9 is a graphical representation associated with the process of identifying and/or determining an end time of a transient response of an artificial spike. The example graph 900 of FIG. 9 includes the CGI signal 602 (e.g., CGI signal data) of FIGS. 6-8, and further includes an example smoothed lagged CGI derivative signal 902 (e.g., smoothed lagged CGI derivative signal data) generated by the smoothed lagged CGI derivative generator 510 of FIG. 5 based on the CGI signal 602, and an example lagged CGI signal 904 (e.g., lagged CGI signal data) generated by the lagged CGI generator 512 of FIG. 5 based on the CGI signal 602. The graph 900 of FIG. 9 further includes identification points (e.g., identified and/or determined by the signal editor 518 of FIG. 5) representing and/or corresponding to an example convergence starting point 906 of the smoothed lagged CGI derivative signal 902, and an example end time 908 of the transient response 606 of the artificial spike 604 of the CGI signal 602.

In the illustrated example of FIG. 9, the signal editor 518 has identified and/or determined the convergence starting point 906 of the smoothed lagged CGI derivative signal 902 (e.g., located at approximately t=9660.8 seconds as shown in FIG. 9) based on the location and the associated time of the peak of the lagged CGI signal 904 (e.g., the convergence starting point 906 being two time frames subsequent to the peak of the lagged CGI signal 904). As further shown in FIG. 9, the signal editor 518 has identified and/or determined a point in time, subsequent to the convergence starting point 906, at which the value of the smoothed lagged CGI derivative signal 902 returns to a zero (or near-zero) value (e.g., approximately t=9671.4 seconds as shown in FIG. 9), and has identified the return point of the smoothed lagged CGI derivative signal 902 as the end time 908 of the transient response 606 of the artificial spike 604 of the CGI signal 602.

The example process of identifying and/or determining the end time of the transient response of the artificial spike described above in connection with FIGS. 5 and 9 utilizes the rate of decay of the transient response of the artificial spike. In other examples, the signal editor 518 of FIG. 5 can implement a different process to identify and/or determine the end time of the transient response of the artificial spike. For example, the signal editor 518 of FIG. 5 can identify and/or determine the end time of the transient response of the artificial spike based on a fixed duration relative to the last valid CGI point of the CGI signal data, and/or relative to the start point of the artificial spike. As another example, the signal editor 518 of FIG. 5 can identify and/or determine the end time of the transient response of the artificial spike based on the value of the CGI signal data being within a threshold percentage of the value of the last valid CGI point of the CGI signal data.

In some examples, the signal editor 518 of FIG. 5 implements a timeout function on the duration of the identified and/or determined end time of the transient response of the artificial spike of the CGI signal data relative to the identified and/or determined start time of the artificial spike of the CGI signal data to limit the impact of any unrealistically long computed durations. In instances where the computed duration exceeds the limit imposed by the timeout function, the signal editor 518 of FIG. 5 refrains from modifying, altering, and/or otherwise editing the CGI signal data.

Continuing with the illustrated example of FIG. 5, the signal editor 518 removes a portion of the CGI signal data extending from the identified and/or determined start time of the artificial spike to the identified and/or determined end time of the transient response of the artificial spike. In some examples, the signal editor 518 and/or, more generally, the CGI signal evaluation engine 500 of FIG. 5 causes a backup copy of the original CGI signal data to be generated and/or stored in the memory 530 of FIG. 5 prior to the signal editor 518 removing the identified and/or determined portion of the CGI signal data, thereby ensuring that a backup of the original CGI signal data remains preserved even after the signal editor 518 proceeds with modifying, altering, and/or otherwise editing the original CGI signal data.

Figure 10:
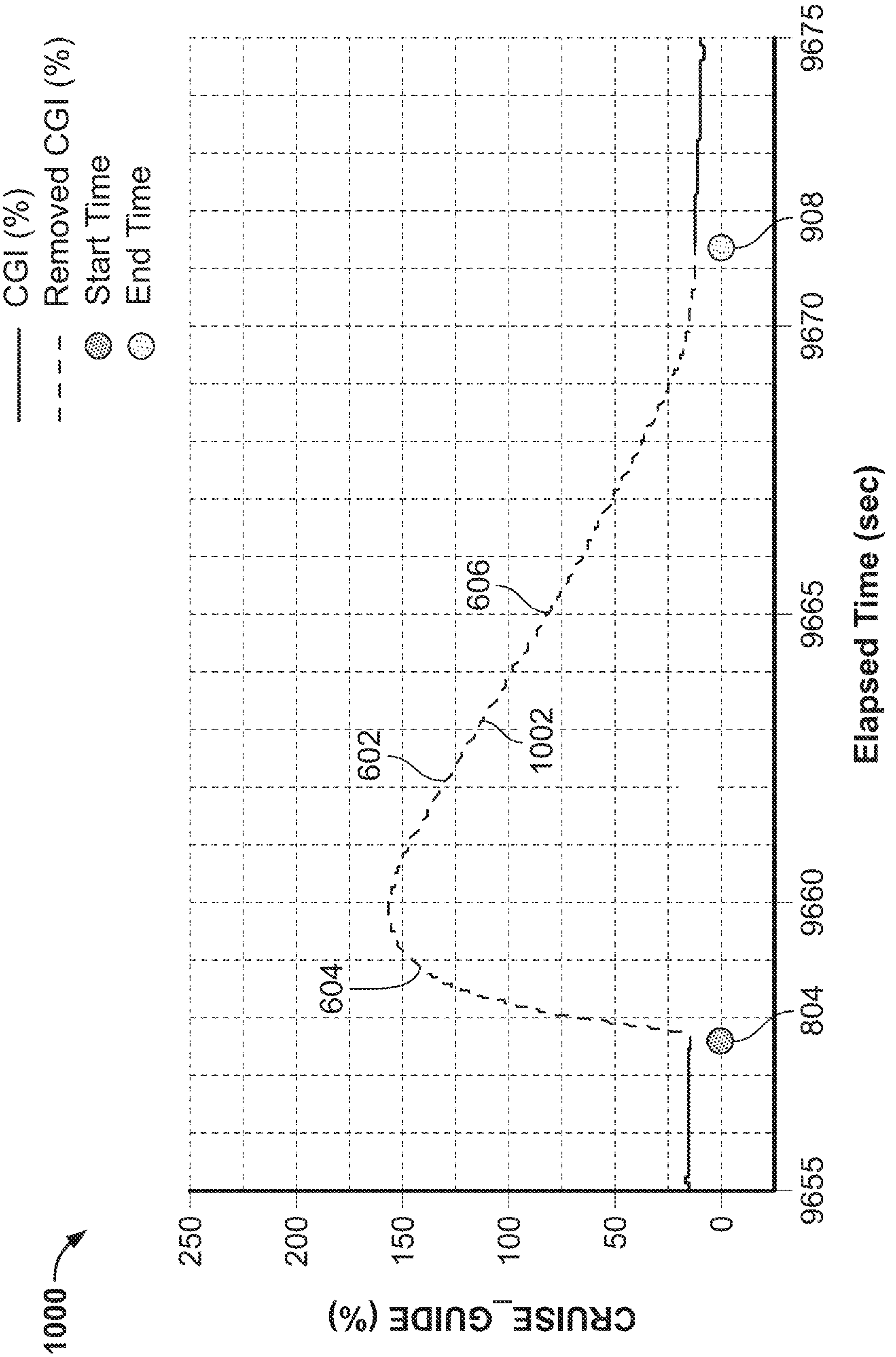
FIG. 10 is a graphical representation associated with the process of removing a portion of CGI signal data that includes an artificial spike and a transient response associated with the artificial spike.

FIG. 10 is a graphical representation associated with the process of removing a portion of CGI signal data extending from the identified and/or determined start time of the artificial spike to the identified and/or determined end time of the transient response of the artificial spike. The example graph 1000 of FIG. 10 includes the CGI signal 602 (e.g., CGI signal data) of FIGS. 6-9. The graph 1000 of FIG. 10 further includes the start time 804 (e.g., as shown in FIG. 8) of the artificial spike 604 of the CGI signal 602, and the end time 908 (e.g., as shown in FIG. 9) of the transient response 606 of the artificial spike 604 of the CGI signal 602. As further shown in FIG. 10, an example portion 1002 of the CGI signal 602 extending from the start time 804 to the end time 908 is illustrated in dashed line format. In the illustrated example of FIG. 10, the indicated portion 1002 of the CGI signal 602 has a duration corresponding to the combined duration of the artificial spike 604 and the transient response 606 of the CGI signal 602. The signal editor 518 of FIG. 5 removes the indicated portion 1002 of the CGI signal 602 in connection with modifying, altering, or otherwise editing the CGI signal data.

Continuing with the illustrated example of FIG. 5, the signal editor 518 replaces the removed portion of the CGI signal data with edited CGI signal data. In connection with replacing the removed portion of the CGI signal data, the signal editor 518 identifies and/or determines a last valid CGI point of the CGI signal data. In some examples, the last valid CGI point is identified as the point in time at which the value of the CGI signal transitions from a constant or near-constant value to an increasing positive value. Once the signal editor 518 of FIG. 5 has identified and/or determined the last valid CGI point, the signal editor 518 populates (e.g., fills in) the previously-removed portion of the CGI signal data (e.g., extending from the identified and/or determined start time of the artificial spike to the identified and/or determined end time of the transient response of the artificial spike) with edited CGI signal data having a value corresponding to (e.g., equal to) the value of the last valid CGI point of the CGI signal.

Figure 11:
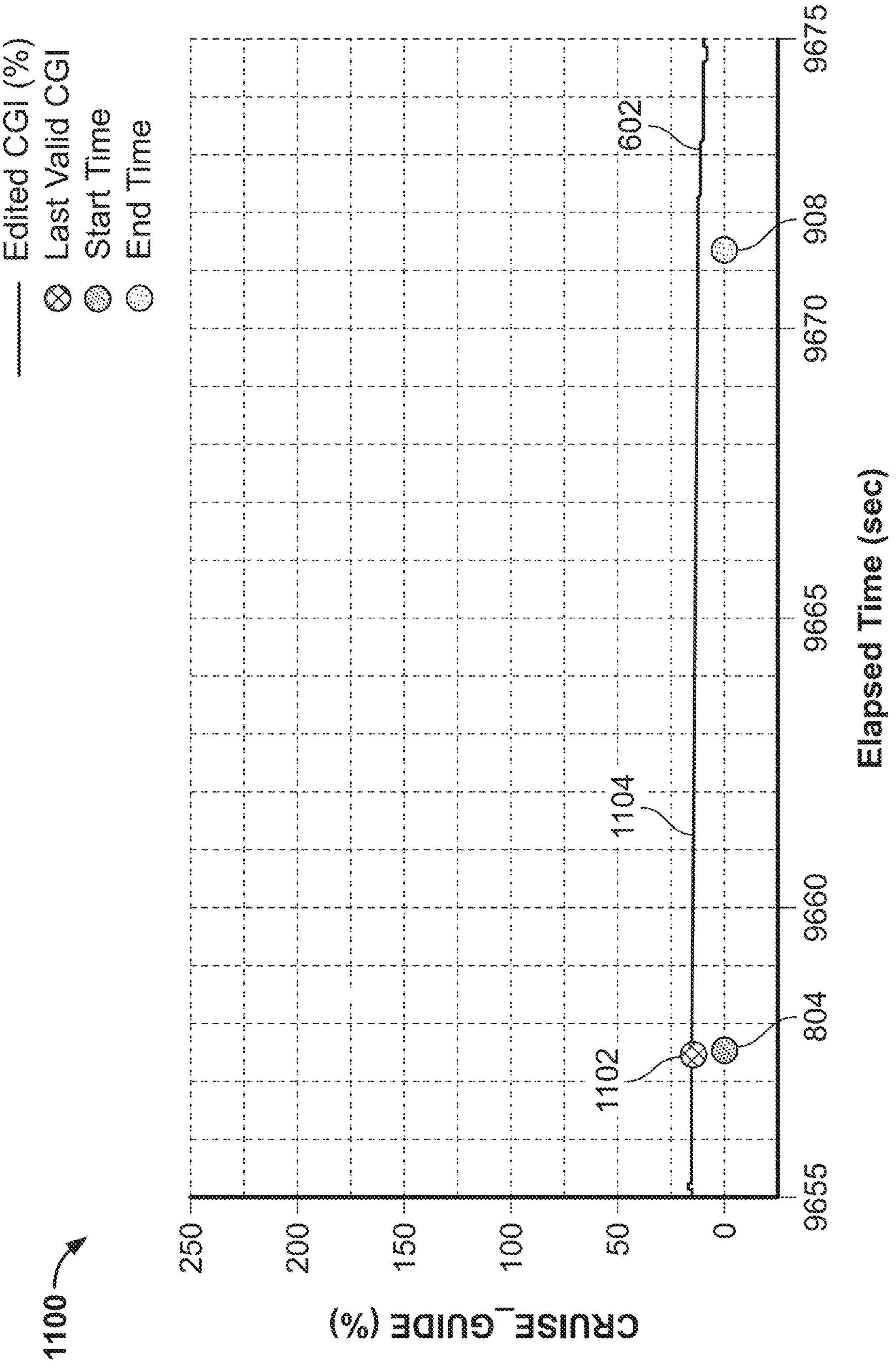
FIG. 11 is a graphical representation associated with the process of replacing a removed portion of CGI signal data with edited CGI signal data.

FIG. 11 is a graphical representation associated with the process of replacing a removed portion of CGI signal data with edited CGI signal data. The example graph 1100 of FIG. 11 includes a portion of the CGI signal 602 (e.g., CGI signal data) of FIGS. 6-10 that remains following removal of the portion 1002 (e.g., as shown in FIG. 10) of the CGI signal 602 by the signal editor 518 of FIG. 5. The graph 1000 of FIG. 10 further includes the start time 804 (e.g., as shown in FIG. 8) of the artificial spike 604 of the CGI signal 602, the end time 908 (e.g., as shown in FIG. 9) of the transient response 606 of the artificial spike 604 of the CGI signal 602, and an example last valid CGI point 1102 of the CGI signal 602.

As shown in FIG. 11, the signal editor 518 has replaced (e.g., populated and/or filled in) the removed portion 1002 of the CGI signal 602 with example edited CGI signal data 1104. In the illustrated example of FIG. 11, the edited CGI signal data 1104 of the CGI signal 602 extends from the start time 804 to the end time 908. The edited CGI signal data 1104 accordingly has a duration corresponding to the removed portion 1002 of the CGI signal 602 (e.g., a duration corresponding to the combined duration of the artificial spike 604 and the transient response 606 of the CGI signal 602. In the illustrated example of FIG. 11, the edited CGI signal data 1104 of the CGI signal 602 has a value (e.g., a constant value) corresponding to the value of the last valid CGI point 1102 of the CGI signal 602.

Returning to the illustrated example of FIG. 5, the user interface 520 includes one or more input device(s) 522 and/or one or more output device(s) 524 that enable a user to interact with (e.g., enter information, data, and/or commands to, and/or receive information, data, and/or commands from) the processor circuitry 502 and/or, more generally, the CGI signal evaluation engine 500. The input device(s) 522 can be implemented by, for example, one or more of a keyboard, a mouse, a touchscreen, a track-pad, a track-ball, a button, a dial, a knob, a switch, an audio sensor, a microphone, an image sensor, a camera, and/or a voice recognition system. The output device(s) 524 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker. In the illustrated example of FIG. 5, the user interface 520 is in electrical communication with the processor circuitry 502, the network interface 526, and/or the memory 530 of FIG. 5.

The network interface 526 of FIG. 5 includes one or more communication device(s) 528 (e.g., transmitter(s), receiver(s), transceiver(s), modem(s), gateway(s), wireless access point(s), etc.) to facilitate exchange of data with external machines (e.g., computing devices of any kind, including the aircraft 102 of FIG. 1 and/or the remote device(s) 532 of FIG. 5) by a communication network (e.g., a wireless communication network). Communications transmitted and/or received via the communication device(s) 528 and/or, more generally, via the network interface 526 can be made over and/or carried by, for example, a satellite system, a wireless system, a cellular telephone system, etc. In the illustrated example of FIG. 5, the network interface 526 is in electrical communication with the processor circuitry 502, the user interface 520, and/or the memory 530 of FIG. 5.

The memory 530 of FIG. 5 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information and/or data stored in the memory 530 of FIG. 5 can be stored in any file and/or data structure format, organization scheme, and/or arrangement.

The memory 530 of FIG. 5 stores information and/or data including signal-based data (e.g., CGI signal data, CGI derivative signal data, lagged CGI derivative signal data, washout CGI signal data, smoothed lagged CGI derivative signal data, lagged CGI signal data, edited CGI signal data, etc.), point-based data (e.g., CGI derivative peak data, lagged CGI derivative peak data, washout CGI peak data, smoothed lagged CGI derivative peak data, lagged CGI peak data, CGI crossing point data, last valid CGI point data, start time data, convergence starting point data, end time data, etc.), and/or criteria-based data (e.g., CGI derivative threshold data, lagged CGI derivative threshold data, washout CGI threshold data, smoothed lagged CGI derivative threshold data, lagged CGI threshold data, low CGI threshold data, etc.) generated, determined, computed, calculated, identified, presented, input, output, transmitted, and/or received by, to, and/or from the processor circuitry 502 (e.g., including the CGI derivative generator 504, the lagged CGI derivative generator 506, the washout CGI generator 508, the smoothed lagged CGI derivative generator 510, the lagged CGI generator 512, the spike identifier 514, the spike classifier 516, and/or the signal editor 518), the user interface 520 (e.g., including the input device(s) 522 and/or the output device(s) 524), and/or the network interface 526 (e.g., including the communication device(s) 528) of FIG. 5. The memory 530 of FIG. 5 is accessible to one or more of the processor circuitry 502 (e.g., including the CGI derivative generator 504, the lagged CGI derivative generator 506, the washout CGI generator 508, the smoothed lagged CGI derivative generator 510, the lagged CGI generator 512, the spike identifier 514, the spike classifier 516, and/or the signal editor 518), the user interface 520 (e.g., including the input device(s) 522 and/or the output device(s) 524), and/or the network interface 526 (e.g., including the communication device(s) 528) of FIG. 5.

The remote device(s) 532 of FIG. 5 can be included and/or can be implemented by an aircraft (e.g., the aircraft 102 of FIG. 1), a ground station (e.g., the ground station 104 of FIG. 1), a workstation, a personal computer, a server, a self-learning machine (e.g., a neural network), a mobile device (e.g., a cell phone, a smart phone, a tablet), a personal digital assistant (PDA), an Internet appliance, or any other type of computing device. The remote device(s) 532 can include(s) a network interface, a memory, and/or processor circuitry respectively configured to transmit and/or receive information and/or data to and/or from the CGI signal evaluation engine 500, to store such information and/or data, and to evaluate and/or process such data.

While an example manner of implementing the CGI signal evaluation engine 500 is illustrated in FIG. 5, one or more of the elements, processes, and/or devices illustrated in FIG. 5 may be combined, divided, re-arranged, omitted, eliminated, and/or implemented in any other way. Further, the example processor circuitry 502 (e.g., including the example CGI derivative generator 504, the example lagged CGI derivative generator 506, the example washout CGI generator 508, the example smoothed lagged CGI derivative generator 510, the example lagged CGI generator 512, the example spike identifier 514, the example spike classifier 516, and the example signal editor 518), the example user interface 520 (e.g., including the example input device(s) 522 and the example output device(s) 524), the example network interface 526 (e.g., including the example communication device(s) 528), the example memory 530, and/or, more generally, the CGI signal evaluation engine 500 of FIG. 5, may be implemented by hardware alone or by hardware in combination with software and/or firmware. Thus, for example, any of the example processor circuitry 502 (e.g., including the example CGI derivative generator 504, the example lagged CGI derivative generator 506, the example washout CGI generator 508, the example smoothed lagged CGI derivative generator 510, the example lagged CGI generator 512, the example spike identifier 514, the example spike classifier 516, and the example signal editor 518), the example user interface 520 (e.g., including the example input device(s) 522 and the example output device(s) 524), the example network interface 526 (e.g., including the example communication device(s) 528), the example memory 530, and/or, more generally, the CGI signal evaluation engine 500 of FIG. 5, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example CGI signal evaluation engine 500 of FIG. 5 may include one or more elements, processes, and/or devices in addition to, or instead of, those illustrated in FIG. 5, and/or may include more than one of any or all of the illustrated elements, processes, and devices.

Flowcharts representing example machine-readable instructions, which may be executed to configure processor circuitry to implement the CGI signal evaluation engine 500 of FIG. 5, are shown in FIGS. 12, 13, 14A-14B, and/or 15. The machine-readable instructions may be one or more executable program(s) or portion(s) thereof for execution by processor circuitry, such as the processor circuitry 1602 shown in the example processor platform 1600 discussed below in connection with FIG. 16 and/or the example processor circuitry discussed below in connection with FIGS. 17 and/or 18. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program(s) and/or the portion(s) thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although example programs are described with reference to the flowcharts illustrated in FIGS. 12, 13, 14A-14B, and/or 15, many other methods of implementing the example CGI signal evaluation engine 500 of FIG. 5 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or any other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or any other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 12, 13, 14A-14B, and/or 15 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable medium" and "non-transitory computer-readable storage medium" are expressly defined to include any type of computer-readable storage device and/or storage disk and to exclude propagating signals and to exclude transmission media.

The terms "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

Figure 12:
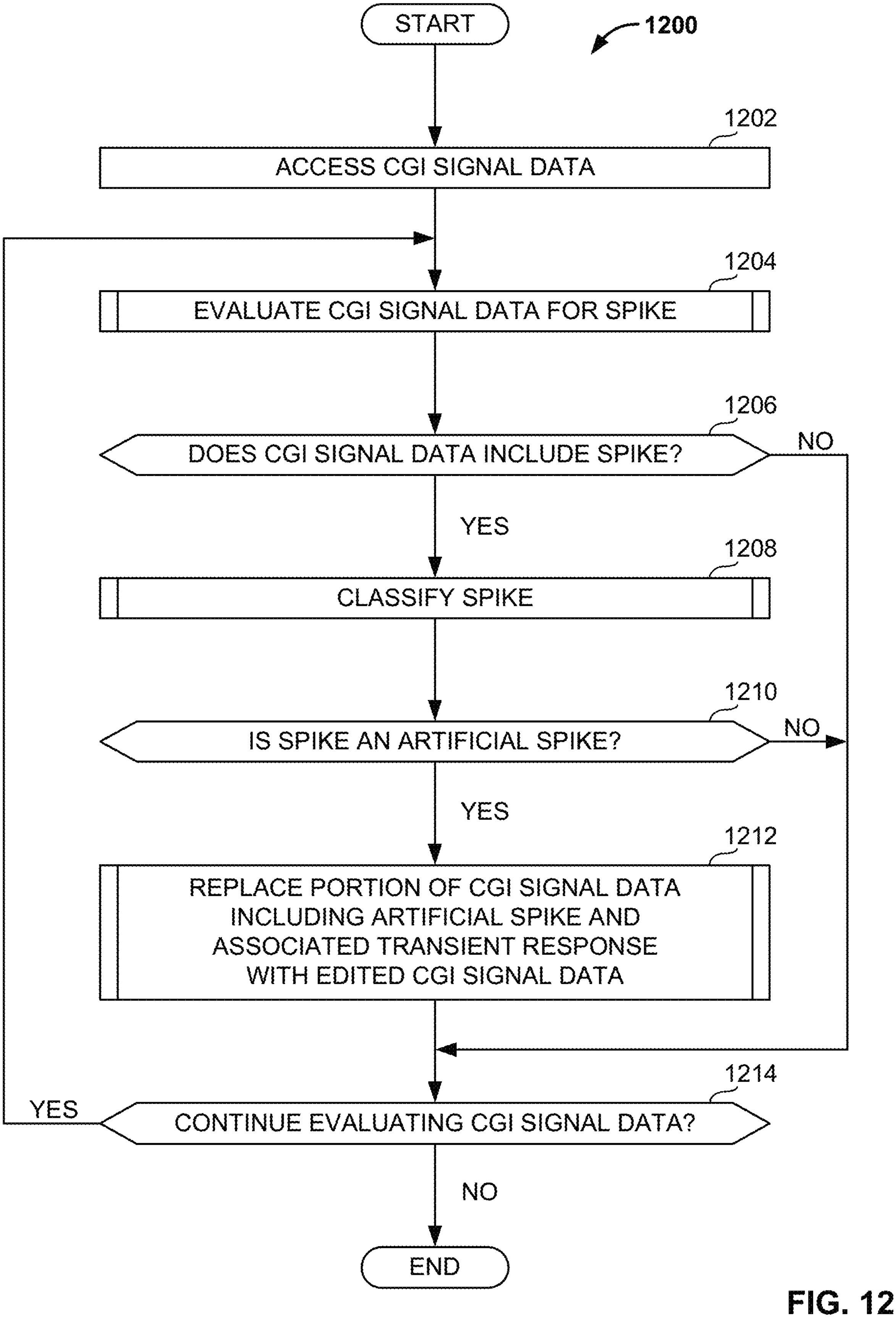
FIG. 12 is a flowchart representative of example machine-readable instructions and/or example operations that may be executed by processor circuitry to implement the CGI signal evaluation engine of FIG. 5.

FIG. 12 is a flowchart representative of example machine-readable instructions and/or example operations 1200 that may be executed by processor circuitry (e.g., the processor circuitry 502 of FIG. 5) to implement the CGI signal evaluation engine 500 of FIG. 5. The machine-readable instructions and/or operations 1200 of FIG. 12 begin at Block 1202 when the processor circuitry 502 of FIG. 5 accesses CGI signal data. For example, the processor circuitry 502 can access CGI signal data received by and/or at the network interface 526 of FIG. 5, and/or can access CGI signal data stored by and/or on the memory 530 of FIG. 5. Following Block 1202, control of the example machine-readable instructions and/or operations 1200 of FIG. 12 proceeds to Block 1204.

At Block 1204, the spike identifier 514 of FIG. 5 evaluates the CGI signal data for the presence of a spike. Example machine-readable instructions and/or operations that may be used to implement Block 1204 of the example machine-readable instructions and/or operations 1200 of FIG. 12 are described in greater detail below in connection with FIG. 13. Following Block 1204, control of the example machine-readable instructions and/or operations 1200 of FIG. 12 proceeds to Block 1206.

At Block 1206, the spike identifier 514 of FIG. 5 determines whether the CGI signal data includes a spike. If the spike identifier 514 determines at Block 1206 that the CGI signal data includes a spike, control of the machine-readable instructions and/or operations 1200 of FIG. 12 proceeds to Block 1208. If the spike identifier 514 instead determines at Block 1206 that the CGI signal data does not include a spike, control of the machine-readable instructions and/or operations 1200 of FIG. 12 proceeds to Block 1214.

At Block 1208, the spike classifier 516 of FIG. 5 classifies the spike identified within the CGI signal data. Example machine-readable instructions and/or operations that may be used to implement Block 1208 of the example machine-readable instructions and/or operations 1200 of FIG. 12 are described in greater detail below in connection with FIGS. 14A-14B. Following Block 1208, control of the example machine-readable instructions and/or operations 1200 of FIG. 12 proceeds to Block 1210.

At Block 1210, the spike classifier 516 of FIG. 5 determines whether the spike identified within the CGI signal data is an artificial spike. If the spike classifier 516 determines at Block 1210 that the spike identified within the CGI signal data is an artificial spike, control of the machine-readable instructions and/or operations 1200 of FIG. 12 proceeds to Block 1212. If the spike classifier 516 instead determines at Block 1210 that the spike identified within the CGI signal data is not an artificial spike, control of the machine-readable instructions and/or operations 1200 of FIG. 12 proceeds to Block 1214.

At Block 1212, the signal editor 518 of FIG. 5 replaces a portion of the CGI signal data that includes the artificial spike and a transient response of the artificial spike with edited CGI signal data. Example machine-readable instructions and/or operations that may be used to implement Block 1212 of the example machine-readable instructions and/or operations 1200 of FIG. 12 are described in greater detail below in connection with FIG. 15. Following Block 1212, control of the example machine-readable instructions and/or operations 1200 of FIG. 12 proceeds to Block 1214.

At Block 1214, the processor circuitry 502 of FIG. 5 determines whether to continue evaluating the CGI signal data. For example, the processor circuitry 502 may determine that a request, command, and/or instruction to discontinue evaluation of the CGI signal data has been received based on a user input, a user selection, and/or a user interaction to, of, and/or with one or more of the input device(s) 522 of the user interface 520 of FIG. 5. If the processor circuitry 502 determines at Block 1214 that evaluation of the CGI signal data is to continue, control of the machine-readable instructions and/or operations 1200 of FIG. 12 returns to Block 1204. If the processor circuitry 502 instead determines at Block 1214 that evaluation of the CGI signal data is to discontinue (e.g., to not continue), the machine-readable instructions and/or operations 1200 of FIG. 12 end.

Figure 13:
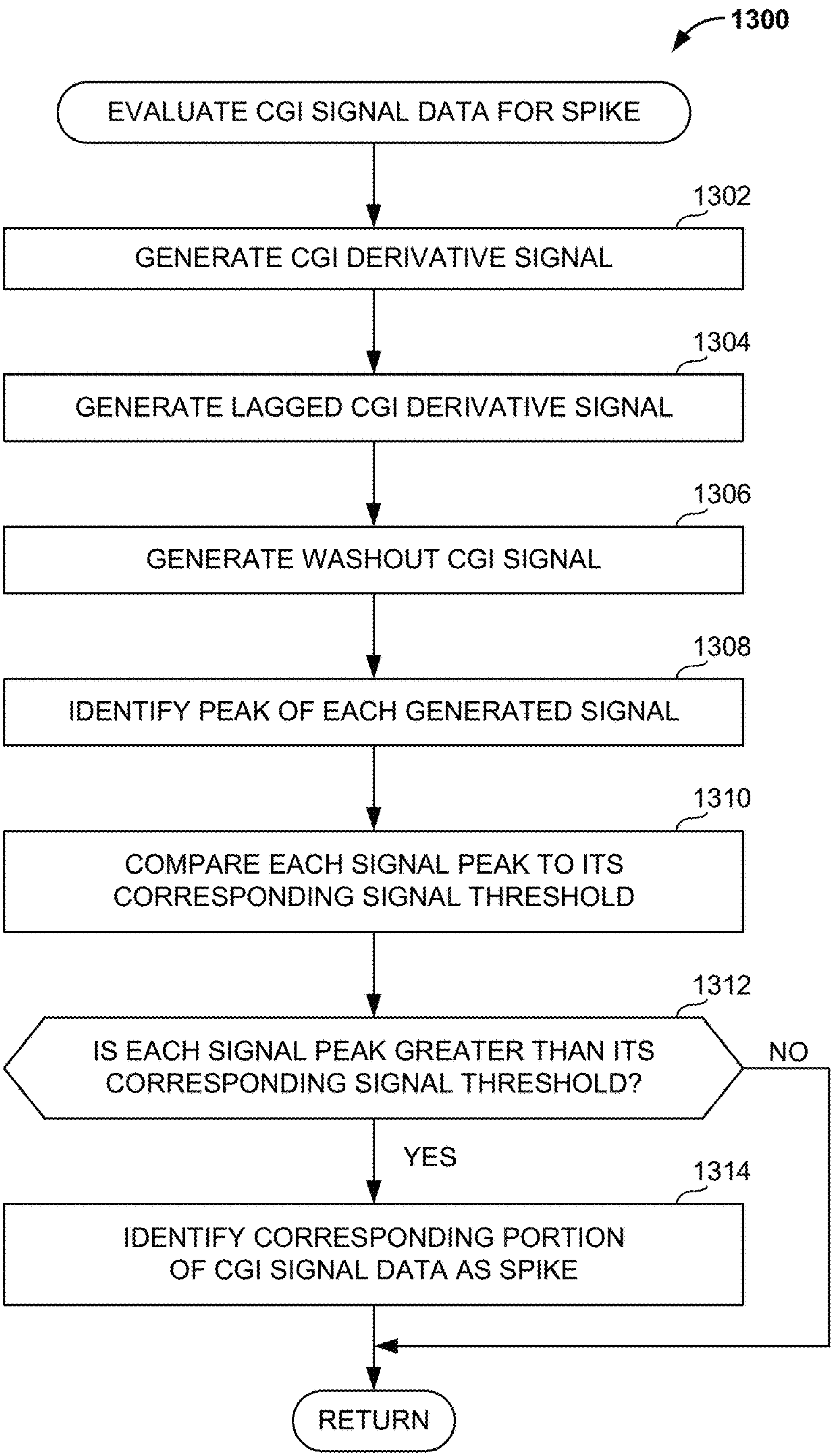
FIG. 13 is a flowchart representative of example machine-readable instructions and/or example operations that may be executed by processor circuitry to evaluate CGI signal data for the presence of a spike.

FIG. 13 is a flowchart representative of example machine-readable instructions and/or example operations 1300 that may be executed by processor circuitry (e.g., the processor circuitry 502 of FIG. 5) to evaluate CGI signal data for the presence of a spike. Example machine-readable instructions and/or operations of Block 1302, Block 1304, Block 1306, Block 1308, Block 1310, Block 1312, and Block 1314 of FIG. 13 may be used to implement Block 1204 of the machine-readable instructions and/or operations 1200 of FIG. 12.

The machine-readable instructions and/or operations 1300 of FIG. 13 begin at Block 1302 when the CGI derivative generator 504 of FIG. 5 generates a CGI derivative signal (e.g., CGI derivative signal data) based on the CGI signal data. Following Block 1302, control of the example machine-readable instructions and/or operations 1300 of FIG. 13 proceeds to Block 1304.

At Block 1304, the lagged CGI derivative generator 506 of FIG. 5 generates a lagged CGI derivative signal (e.g., lagged CGI derivative signal data) based on the CGI signal data. Following Block 1304, control of the example machine-readable instructions and/or operations 1300 of FIG. 13 proceeds to Block 1306.

At Block 1306, the washout CGI generator 508 of FIG. 5 generates a washout CGI signal (e.g., washout CGI signal data) based on the CGI signal data. Following Block 1306, control of the example machine-readable instructions and/or operations 1300 of FIG. 13 proceeds to Block 1308.

At Block 1308, the spike identifier 514 of FIG. 5 identifies and/or determines a peak (e.g., a maximum amplitude) of each of the generated signals. More specifically, the spike identifier 514 identifies and/or determines a peak of the CGI derivative signal (e.g., as generated at Block 1302), a peak of the lagged CGI derivative signal (e.g., as generated at Block 1304), and a peak of the washout CGI signal (e.g., as generated at Block 1306). Following Block 1308, control of the example machine-readable instructions and/or operations 1300 of FIG. 13 proceeds to Block 1310.

At Block 1310, the spike identifier 514 of FIG. 5 compares each signal peak to a corresponding signal threshold. More specifically, the spike identifier 514 compares the CGI derivative peak to a CGI derivative threshold, compares the lagged CGI derivative peak to a lagged CGI derivative threshold, and compares the washout CGI peak to a washout CGI threshold. Following Block 1310, control of the example machine-readable instructions and/or operations 1300 of FIG. 13 proceeds to Block 1312.

At Block 1312, the spike identifier 514 of FIG. 5 determines whether each signal peak is greater than its corresponding signal threshold. More specifically, the spike identifier 514 determines whether the CGI derivative peak was determined to be greater than the CGI derivative threshold, whether the lagged CGI derivative peak was determined to be greater than the lagged CGI derivative threshold, and whether the washout CGI peak was determined to be greater than the washout CGI threshold. If the spike identifier 514 determines at Block 1312 that each signal peak is greater than (e.g., was determined at Block 1310 to be greater than) its corresponding signal threshold, control of the machine-readable instructions and/or operations 1300 of FIG. 13 proceeds to Block 1314. If the spike identifier 514 instead determines at Block 1312 that any (e.g., one or more) signal peak is not greater than (e.g., was determined at Block 1310 to be less than) its corresponding signal threshold, control of the machine-readable instructions and/or operations 1300 of FIG. 13 returns to a function call such as Block 1204 of the example machine-readable instructions and/or operations 1200 of FIG. 12, and does so with an indication that no spike has been identified in the evaluated CGI signal data.

At Block 1314, the spike identifier 514 of FIG. 5 identifies a corresponding portion of the CGI signal data as constituting a spike. Following Block 1314, control of the example machine-readable instructions and/or operations 1300 of FIG. 13 returns to a function call such as Block 1204 of the example machine-readable instructions and/or operations 1200 of FIG. 12, and does so with an indication that a spike has been identified in the evaluated CGI signal data.

Figure 14A:
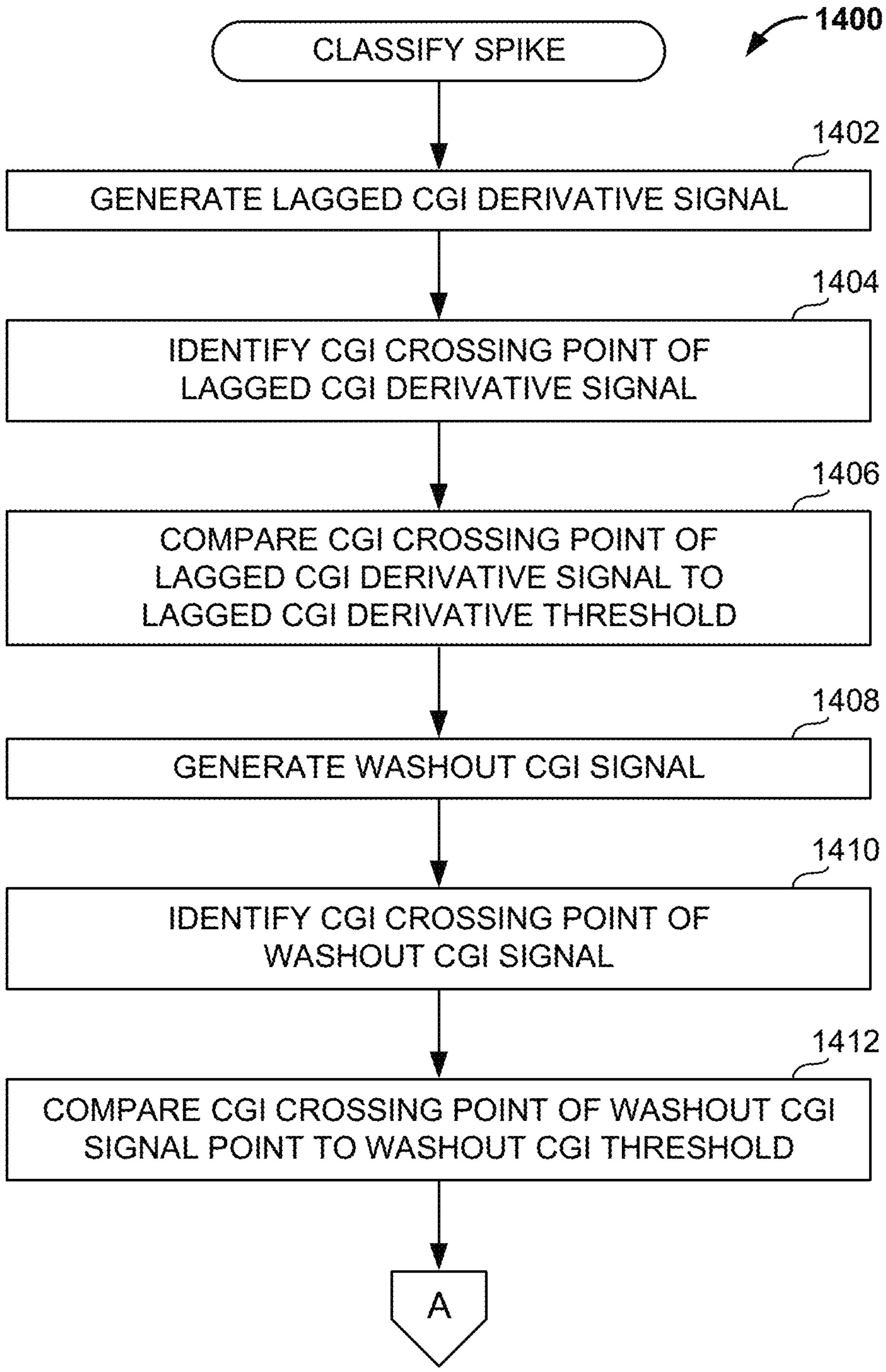
FIGS. 14A-14B are a flowchart representative of example machine-readable instructions and/or example operations that may be executed by processor circuitry to classify a spike identified within CGI signal data.
Figure 14B:
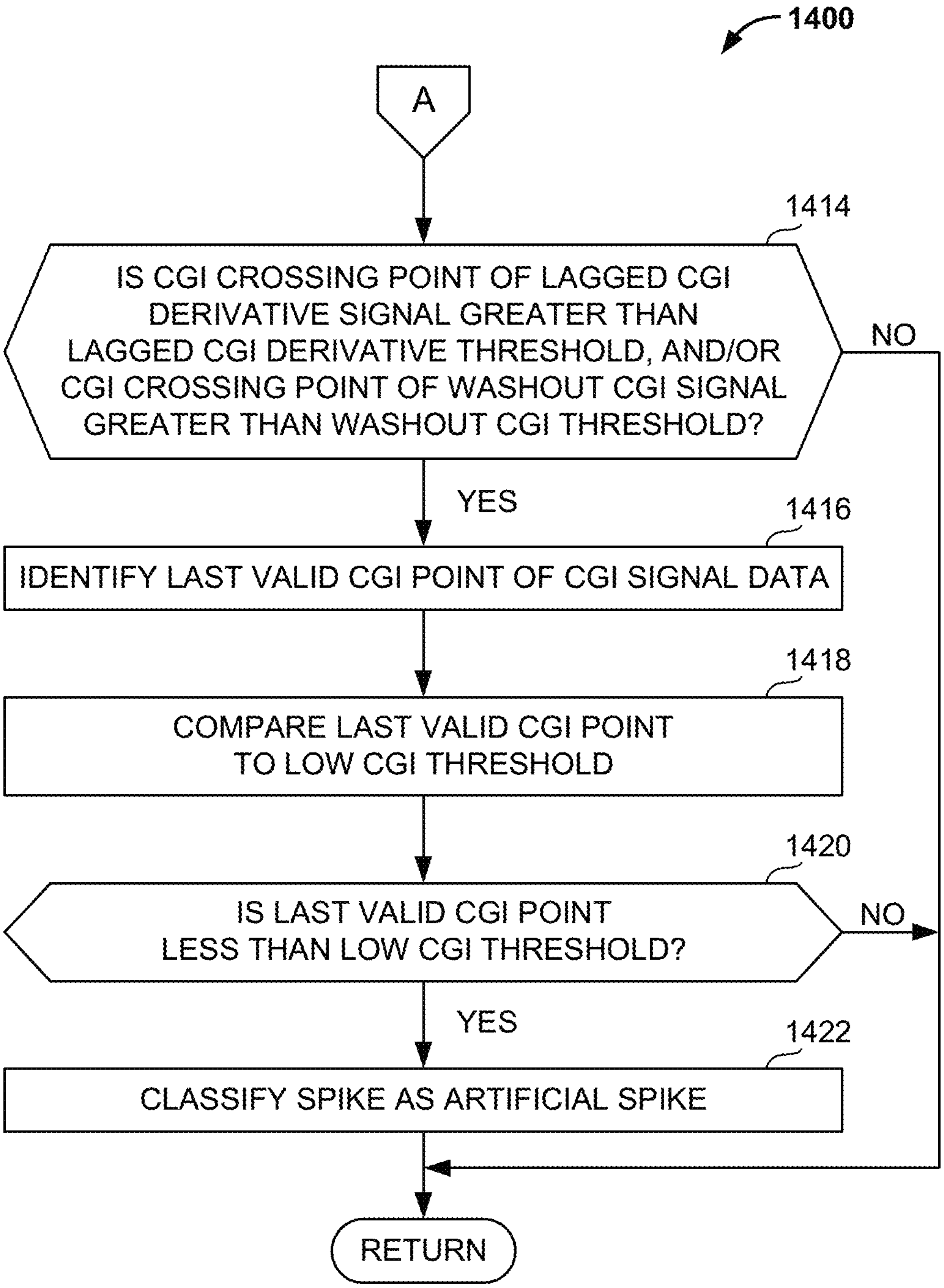

FIGS. 14A-14B are a flowchart representative of example machine-readable instructions and/or example operations 1400 that may be executed by processor circuitry (e.g., the processor circuitry 502 of FIG. 5) to classify a spike identified within CGI signal data. Example machine-readable instructions and/or operations of Block 1402, Block 1404, Block 1406, Block 1408, Block 1410, Block 1412, Block 1414, Block 1416, Block 1418, Block 1420, and Block 1422 of FIGS. 14A-14B may be used to implement Block 1208 of the machine-readable instructions and/or operations 1200 of FIG. 12.

The machine-readable instructions and/or operations 1400 of FIGS. 14A-14B begin at Block 1402 when the lagged CGI derivative generator 506 of FIG. 5 generates a lagged CGI derivative signal (e.g., lagged CGI derivative signal data) based on the CGI signal data. Following Block 1402, control of the example machine-readable instructions and/or operations 1400 of FIGS. 14A-14B proceeds to Block 1404.

At Block 1404, the spike classifier 516 of FIG. 5 identifies and/or determines a CGI crossing point of the lagged CGI derivative signal. Following Block 1404, control of the example machine-readable instructions and/or operations 1400 of FIGS. 14A-14B proceeds to Block 1406.

At Block 1406, the spike classifier 516 of FIG. 5 compares the CGI crossing point of the lagged CGI derivative signal to a lagged CGI derivative threshold. Following Block 1406, control of the example machine-readable instructions and/or operations 1400 of FIGS. 14A-14B proceeds to Block 1408.

At Block 1408, the washout CGI generator 508 of FIG. 5 generates a washout CGI signal (e.g., washout CGI signal data) based on the CGI signal data. Following Block 1408, control of the example machine-readable instructions and/or operations 1400 of FIGS. 14A-14B proceeds to Block 1410.

At Block 1410, the spike classifier 516 of FIG. 5 identifies and/or determines a CGI crossing point of the washout CGI signal. Following Block 1410, control of the example machine-readable instructions and/or operations 1400 of FIGS. 14A-14B proceeds to Block 1412.

At Block 1412, the spike classifier 516 of FIG. 5 compares the CGI crossing point of the washout CGI signal to a washout CGI threshold. Following Block 1412, control of the example machine-readable instructions and/or operations 1400 of FIGS. 14A-14B proceeds to Block 1414.

At Block 1414, the spike classifier 516 of FIG. 5 determines (e.g., based on the comparisons performed at Block 1406 and Block 1412) whether the CGI crossing point of the lagged CGI derivative signal is greater than the lagged CGI derivative threshold and/or the CGI crossing point of the washout CGI signal is greater than the washout CGI threshold. If the spike classifier 516 determines at Block 1414 that the CGI crossing point of the lagged CGI derivative signal is greater than the lagged CGI derivative threshold and/or the CGI crossing point of the washout CGI signal is greater than the washout CGI threshold, control of the example machine-readable instructions and/or operations 1400 of FIGS. 14A-14B proceeds to Block 1416. If the spike classifier 516 instead determines at Block 1414 that the CGI crossing point of the lagged CGI derivative signal is not greater than the lagged CGI derivative threshold (e.g., that the CGI crossing point of the lagged CGI derivative signal is less than the lagged CGI derivative threshold) and the CGI crossing point of the washout CGI signal is not greater than the washout CGI threshold (e.g., that the CGI crossing point of the washout CGI signal is less than the washout CGI threshold), control of the example machine-readable instructions and/or operations 1400 of FIGS. 14A-14B returns to a function call such as Block 1208 of the example machine-readable instructions and/or operations 1200 of FIG. 12, and does so with an indication that the identified spike is not an artificial spike.

At Block 1416, the spike classifier 516 of FIG. 5 identifies and/or determines a last valid CGI point of the CGI signal data. Following Block 1416, control of the example machine-readable instructions and/or operations 1400 of FIGS. 14A-14B proceeds to Block 1418.

At Block 1418, the spike classifier 516 of FIG. 5 compares the last valid CGI point of the CGI signal data to a low CGI threshold. Following Block 1418, control of the example machine-readable instructions and/or operations 1400 of FIGS. 14A-14B proceeds to Block 1420.

At Block 1420, the spike classifier 516 of FIG. 5 determines (e.g., based on the comparison performed at Block 1418) whether the last valid CGI point of the CGI signal data is less than the low CGI threshold. If the spike classifier 516 determines at Block 1420 that the last valid CGI point of the CGI signal data is less than the low CGI threshold, control of the example machine-readable instructions and/or operations 1400 of FIGS. 14A-14B proceeds to Block 1422. If the spike classifier 516 instead determines at Block 1420 that the last valid CGI point of the CGI signal data is not less than the low CGI threshold (e.g., that the last valid CGI point of the CGI signal data is greater than the low CGI threshold), control of the example machine-readable instructions and/or operations 1400 of FIGS. 14A-14B returns to a function call such as Block 1208 of the example machine-readable instructions and/or operations 1200 of FIG. 12, and does so with an indication that the identified spike is not an artificial spike.

At Block 1422, the spike classifier 516 of FIG. 5 classifies and/or identifies the identified spike as constituting an artificial spike. Following Block 1422, control of the example machine-readable instructions and/or operations 1400 of FIGS. 14A-14B returns to a function call such as Block 1208 of the example machine-readable instructions and/or operations 1200 of FIG. 12, and does so with an indication that the identified spike of the CGI signal data is an artificial spike.

Figure 15:
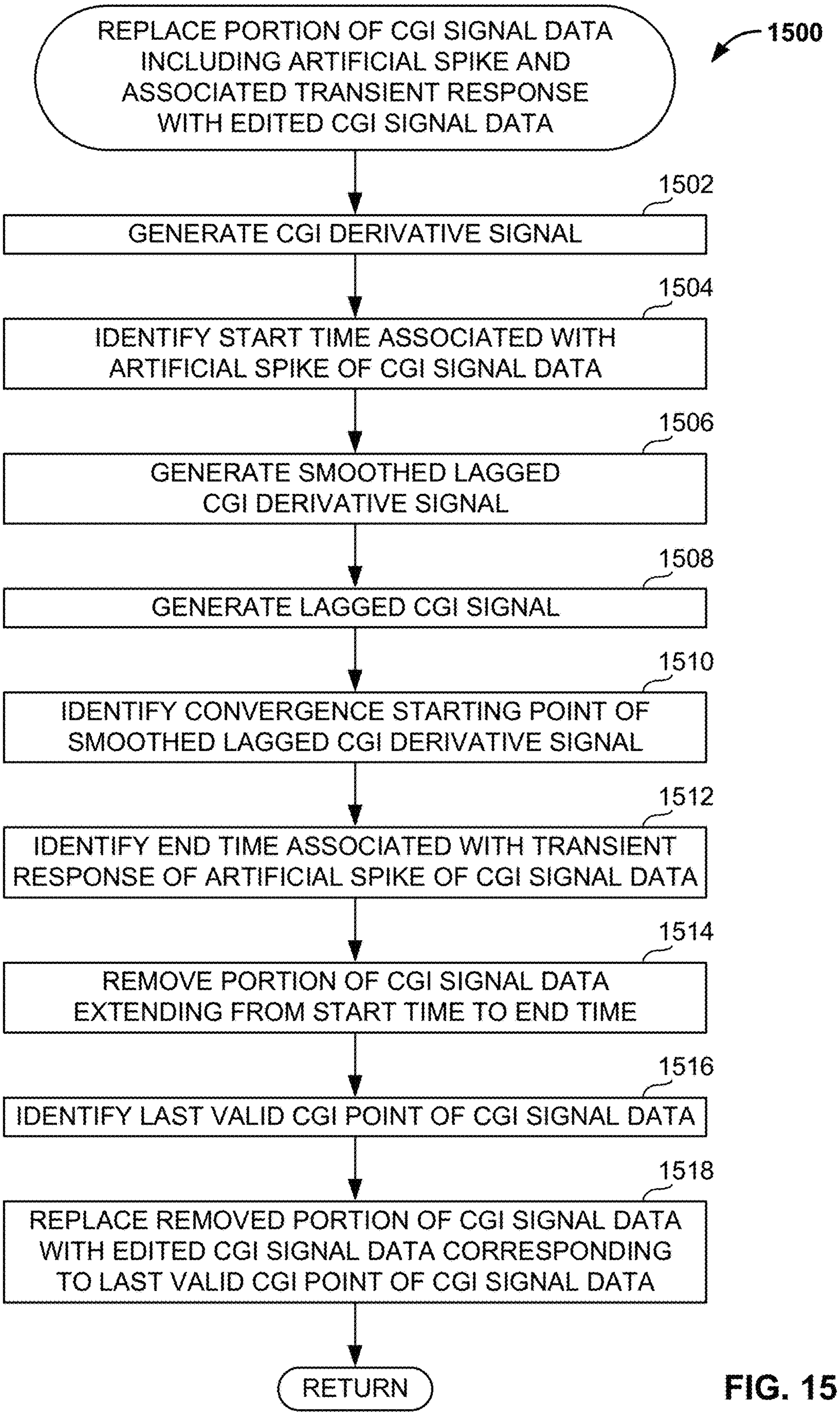
FIG. 15 is a flowchart representative of example machine-readable instructions and/or example operations that may be executed by processor circuitry to replace a portion of CGI signal data that includes an artificial spike and a transient response of the artificial spike with edited CGI signal data.

FIG. 15 is a flowchart representative of example machine-readable instructions and/or example operations 1500 that may be executed by processor circuitry (e.g., the processor circuitry 502 of FIG. 5) to replace a portion of CGI signal data that includes an artificial spike and a transient response of the artificial spike with edited CGI signal data. Example machine-readable instructions and/or operations of Block 1502, Block 1504, Block 1506, Block 1508, Block 1510, Block 1512, Block 1514, Block 1516, and Block 1518 of FIG. 15 may be used to implement Block 1212 of the machine-readable instructions and/or operations 1200 of FIG. 12.

The machine-readable instructions and/or operations 1500 of FIG. 15 begin at Block 1502 when the CGI derivative generator 504 of FIG. 5 generates a CGI derivative signal (e.g., CGI derivative signal data) based on the CGI signal data. Following Block 1502, control of the example machine-readable instructions and/or operations 1500 of FIG. 15 proceeds to Block 1504.

At Block 1504, the signal editor 518 of FIG. 5 identifies and/or determines a start time associated with the artificial spike of the CGI signal data. Following Block 1504, control of the example machine-readable instructions and/or operations 1500 of FIG. 15 proceeds to Block 1506.

At Block 1506, the smoothed lagged CGI derivative generator 510 of FIG. 5 generates a smoothed lagged CGI derivative signal (e.g., smoothed lagged CGI derivative signal data) based on the CGI signal data. Following Block 1506, control of the example machine-readable instructions and/or operations 1500 of FIG. 15 proceeds to Block 1508.

At Block 1508, the lagged CGI generator 512 of FIG. 5 generates a lagged CGI signal (e.g., lagged CGI signal data) based on the CGI signal data. Following Block 1508, control of the example machine-readable instructions and/or operations 1500 of FIG. 15 proceeds to Block 1510.

At Block 1510, the signal editor 518 of FIG. 5 identifies and/or determines a convergence starting point of the smoothed lagged CGI derivative signal. Following Block 1510, control of the example machine-readable instructions and/or operations 1500 of FIG. 15 proceeds to Block 1512.

At Block 1512, the signal editor 518 of FIG. 5 identifies and/or determines an end time associated with a transient response of the artificial spike of the CGI signal data. Following Block 1512, control of the example machine-readable instructions and/or operations 1500 of FIG. 15 proceeds to Block 1514.

At Block 1514, the signal editor 518 of FIG. 5 removes a portion of the CGI signal data extending from the start time of the artificial spike to the end time of the transient response of the artificial spike. Following Block 1514, control of the example machine-readable instructions and/or operations 1500 of FIG. 15 proceeds to Block 1516.

At Block 1516, the signal editor 518 of FIG. 5 identifies and/or determines a last valid CGI point of the CGI signal data. Following Block 1516, control of the example machine-readable instructions and/or operations 1500 of FIG. 15 proceeds to Block 1518.

At Block 1518, the signal editor 518 of FIG. 5 replaces the removed portion of the CGI signal data with edited CGI signal data corresponding to the last valid CGI point of the CGI signal data. Following Block 1518, control of the example machine-readable instructions and/or operations 1500 of FIG. 15 returns to a function call such as Block 1212 of the example machine-readable instructions and/or operations 1200 of FIG. 12.

Figure 16:
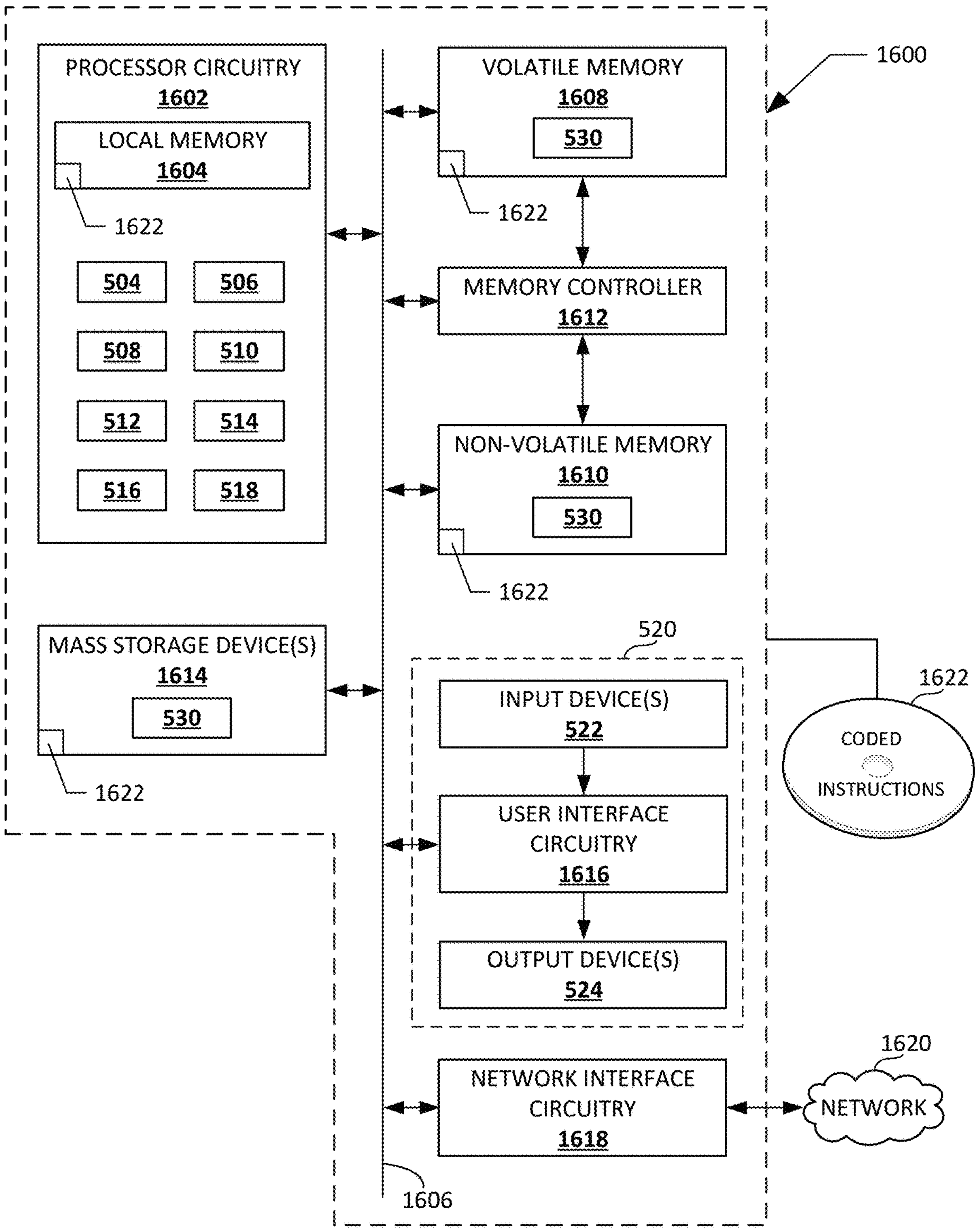
FIG. 16 is a block diagram of an example processor platform including processor circuitry structured to execute and/or instantiate the machine-readable instructions and/or operations of FIGS. 12, 13, 14A-14B, and/or 15 to implement the CGI signal evaluation engine of FIG. 5.

FIG. 16 is a block diagram of an example processor platform 1600 including processor circuitry structured to execute and/or instantiate the machine-readable instructions and/or operations of FIGS. 12, 13, 14A-14B, and/or 15 to implement the CGI signal evaluation engine 500 of FIG. 5. The processor platform 1600 can be, for example, a ground station, a workstation, a personal computer, a server, a self-learning machine (e.g., a neural network), a mobile device (e.g., a cell phone, a smart phone, a tablet), a personal digital assistant (PDA), an Internet appliance, or any other type of computing device.

The processor platform 1600 of the illustrated example includes processor circuitry 1602. The processor circuitry 1602 of the illustrated example is hardware. For example, the processor circuitry 1602 can be implemented by one or more integrated circuit(s), logic circuit(s), FPGA(s), microprocessor(s), CPU(s), GPU(s), DSP(s), and/or microcontroller(s) from any desired family or manufacturer. The processor circuitry 1602 may be implemented by one or more semiconductor based (e.g., silicon based) device(s). In this example, the processor circuitry 1602 implements the CGI derivative generator 504, the lagged CGI derivative generator 506, the washout CGI generator 508, the smoothed lagged CGI derivative generator 510, the lagged CGI generator 512, the spike identifier 514, the spike classifier 516, and the signal editor 518 of FIG. 5.

The processor circuitry 1602 of the illustrated example includes a local memory 1604 (e.g., a cache, registers, etc.). The processor circuitry 1602 is in electrical communication with a main memory via a bus 1606, with the main memory including a volatile memory 1608 and a non-volatile memory 1610. The volatile memory 1608 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1610 may be implemented by flash memory and/or any other desired type of memory device. Access to the main memory 1608, 1610 of the illustrated example is controlled by a memory controller 1612.

The processor platform 1600 of the illustrated example also includes one or more mass storage device(s) 1614 to store software and/or data. Examples of such mass storage device(s) 1614 include magnetic storage devices, optical storage devices, floppy disk drives, HDDs, CDs, Blu-ray disk drives, redundant array of independent disks (RAID) systems, solid state storage devices such as flash memory devices, and DVD drives. In the illustrated example of FIG. 16, one or more of the volatile memory 1608, the non-volatile memory 1610, and/or the mass storage device(s) 1614 implement(s) the memory 530 of FIG. 5.

The processor platform 1600 of the illustrated example also includes user interface circuitry 1616. The user interface circuitry 1616 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In the illustrated example, one or more input device(s) 522 are connected to the user interface circuitry 1616. The input device(s) 522 permit(s) a user to enter data and/or commands into the processor circuitry 1602. The input device(s) 522 can be implemented by, for example, one or more of a keyboard, a mouse, a touchscreen, a track-pad, a track-ball, a button, a dial, a knob, a switch, an audio sensor, a microphone, an image sensor, a camera, and/or a voice recognition system. One or more output device(s) 524 are also connected to the user interface circuitry 1616 of the illustrated example. The output device(s) 524 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker. The user interface circuitry 1616 of the illustrated example, thus, typically includes a graphics driver card, a graphics driver chip, and/or graphics processor circuitry such as a GPU. In the illustrated example of FIG. 16, the user interface circuitry 1616, the input device(s) 522, and the output device(s) 524 collectively implement the user interface 520 of FIG. 5.

The processor platform 1600 of the illustrated example also includes network interface circuitry 1618. The network interface circuitry 1618 includes one or more communication device(s) (e.g., transmitter(s), receiver(s), transceiver(s), modem(s), gateway(s), wireless access point(s), etc.) to facilitate exchange of data with external machines (e.g., computing devices of any kind, including those carried by the aircraft 102 of FIG. 1 and/or the remote device(s) 532 of FIG. 5) by a network 1620. The communication can be by, for example, a satellite system, a wireless system, a cellular telephone system, an Ethernet connection, a digital subscriber line (DSL) connection, a telephone line connection, a coaxial cable system, an optical connection, etc. In the illustrated example of FIG. 16, the network interface circuitry 1618 implements the network interface 526 (e.g., including the communication device(s) 528) of FIG. 5.

Coded instructions 1622 including the above-described machine-readable instructions and/or operations of FIGS. 12, 13, 14A-14B, and/or 15 may be stored in the local memory 1604, in the volatile memory 1608, in the non-volatile memory 1610, on the mass storage device(s) 1614, and/or on a removable non-transitory computer-readable storage medium such as a flash memory stick, a dongle, a CD, or a DVD.

Figure 17:
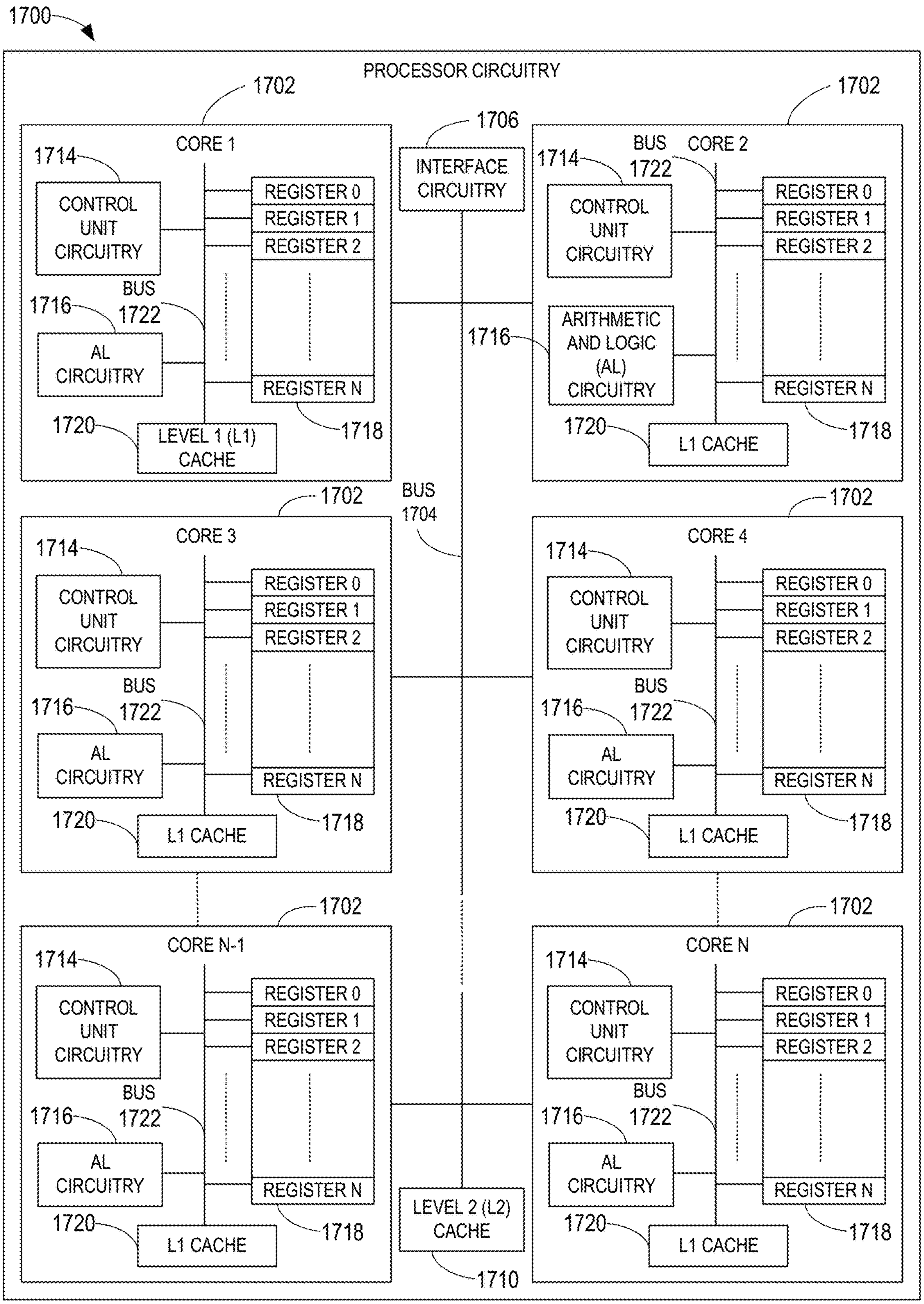
FIG. 17 is a block diagram of an example implementation of the processor circuitry of FIG. 16.

FIG. 17 is a block diagram of an example implementation of the processor circuitry 1602 of FIG. 16. In this example, the processor circuitry 1602 of FIG. 16 is implemented by a microprocessor 1700. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine-readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine-readable instructions and/or operations represented by the flowcharts of FIGS. 12, 13, 14A-14B, and/or 15.

The cores 1702 may communicate by an example bus 1704. In some examples, the bus 1704 may implement a communication bus to effectuate communication associated with one(s) of the cores 1702. For example, the bus 1704 may implement at least one of an Inter-Integrated Circuit (I2C) bus, a Serial Peripheral Interface (SPI) bus, a PCI bus, or a PCIe bus. Additionally, or alternatively, the bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_ cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1608, 1610 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and an example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The bus 1722 may implement at least one of an I2C bus, a SPI bus, a PCI bus, or a PCIe bus.

Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)), and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
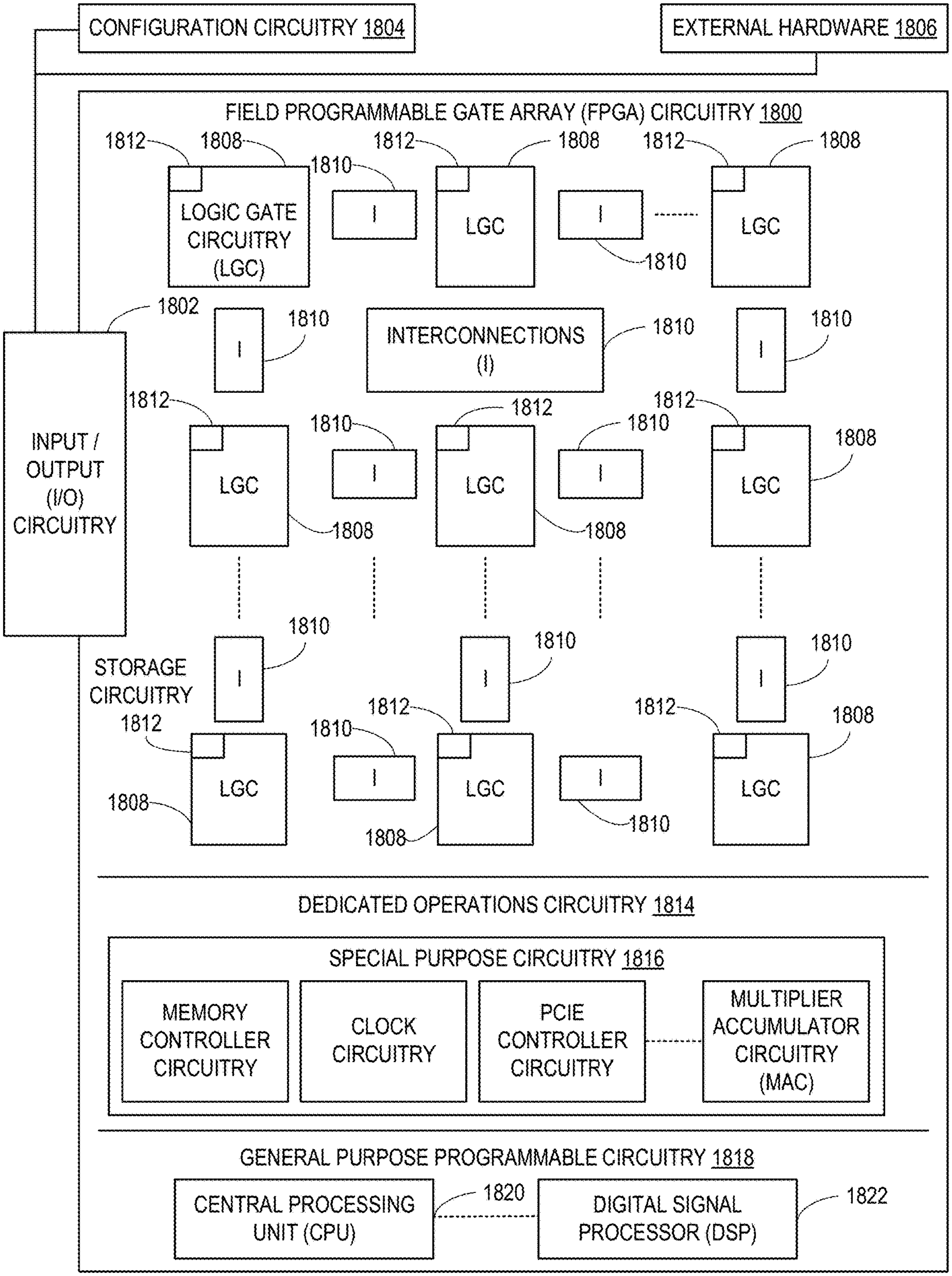
FIG. 18 is a block diagram of another example implementation of the processor circuitry of FIG. 16.

FIG. 18 is a block diagram of another example implementation of the processor circuitry 1602 of FIG. 16. In this example, the processor circuitry 1602 is implemented by FPGA circuitry 1800. The FPGA circuitry 1800 can be used, for example, to perform operations that could otherwise be performed by the example microprocessor 1700 of FIG. 17 executing corresponding machine-readable instructions. However, once configured, the FPGA circuitry 1800 instantiates the machine-readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine-readable instructions and/or operations represented by the flowcharts of FIGS. 12, 13, 14A-14B, and/or 15, but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine-readable instructions and/or operations represented by the flowcharts of FIGS. 12, 13, 14A-14B, and/or 15. In particular, the FPGA circuitry 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 12, 13, 14A-14B, and/or 15. As such, the FPGA circuitry 1800 may be structured to effectively instantiate some or all of the machine-readable instructions of the flowcharts of FIGS. 12, 13, 14A-14B, and/or 15 as dedicated logic circuits to perform the operations corresponding to those software instructions in a dedicated manner analogous to an ASIC. Therefore, the FPGA circuitry 1800 may perform the operations corresponding to the some or all of the machine-readable instructions of FIGS. 12, 13, 14A-14B, and/or 15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18 includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine-readable instructions to configure the FPGA circuitry 1800, or portion(s) thereof. In some such examples, the configuration circuitry 1804 may obtain the machine-readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine-readable instructions of FIGS. 12, 13, 14A-14B, and/or 15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1602 of FIG. 16, many other approaches are contemplated. For example, as mentioned above, modern FPGA circuitry may include an on-board CPU, such as one or more of the example CPU 1820 of FIG. 18. Therefore, the processor circuitry 1602 of FIG. 16 may additionally be implemented by combining the example microprocessor 1700 of FIG. 17 and the example FPGA circuitry 1800 of FIG. 18. In some such hybrid examples, a first portion of the machine-readable instructions and/or operations represented by the flowcharts of FIGS. 12, 13, 14A-14B, and/or 15 may be executed by one or more of the cores 1702 of FIG. 17 and a second portion of the machine-readable instructions and/or operations represented by the flowcharts of FIGS. 12, 13, 14A-14B, and/or 15 may be executed by the FPGA circuitry 1800 of FIG. 18.

In some examples, the processor circuitry 1602 of FIG. 16 may be in one or more packages. For example, the microprocessor 1700 of FIG. 17 and/or the FPGA circuitry 1800 of FIG. 18 may be in one or more packages. In some examples, an XPU may be implemented by the processor circuitry 1602 of FIG. 16, which may be in one or more packages. For example, the XPU may include a CPU in one package, a DSP in another package, a GPU in yet another package, and an FPGA in still yet another package.

From the foregoing, it will be appreciated that the disclosed methods and apparatus advantageously identify, classify, and edit artificial spikes in CGI signal data. The disclosed methods and apparatus cause each identified artificial spike and its associated transient response to be removed from the CGI signal data and replaced with edited CGI signal data corresponding to a value of a last valid CGI point (e.g., immediately prior to the start of the artificial spike) of the CGI signal data. The disclosed methods and apparatus remove and replace the identified artificial spikes and their associated transient responses without corrupting valid portions of the CGI signal data. Such an approach to minimizing the inclusion of artificial spikes in post-processed CGI signal data is highly advantageous relative to other possible minimization approaches (e.g., implementation of a low-pass filter) which can corrupt one or more valid portion(s) of the CGI signal data when applied. In addition to removing and replacing artificial spikes and their transient responses, the disclosed methods and apparatus advantageously and purposefully preserve (e.g., refrain from removing and/or replacing) valid airload-driven spikes, as well as other CGI spikes which cannot be identified and/or classified as being artificial spikes. Implementation of the disclosed methods and apparatus for identifying, classifying, and editing artificial spikes in CGI signal data accordingly occurs without corrupting any valid portion of the CGI signal data, thereby improving the reliability of aircraft rotor load monitoring.

The following paragraphs provide various examples in relation to the disclosed methods and apparatus to identify, classify, and edit artificial spikes in CGI signal data.

Example 1 includes an apparatus. In Example 1, the apparatus comprises memory, machine-readable instructions, and processor circuitry. In Example 1, the processor circuitry is to execute the machine-readable instructions to identify a spike in CGI signal data. In Example 1, the processor circuitry is to execute the machine-readable instructions to determine whether the spike is an artificial spike. In Example 1, in response to determining that the spike is an artificial spike, the processor circuitry is to execute the machine-readable instructions to replace a portion of the CGI signal data including the artificial spike and a transient response of the artificial spike with edited CGI signal data.

Example 2 includes the apparatus of Example 1. In Example 2, the processor circuitry is to execute the machine-readable instructions to compare a peak of a CGI derivative signal generated from the CGI signal data to a CGI derivative threshold. In Example 2, the processor circuitry is to execute the machine-readable instructions to compare a peak of a lagged CGI derivative signal generated from the CGI signal data to a lagged CGI derivative threshold. In Example 2, the processor circuitry is to execute the machine-readable instructions to compare a peak of a washout CGI signal generated from the CGI signal data to a washout CGI threshold. In Example 2, the processor circuitry is to execute the machine-readable instructions to identify that the CGI signal data includes the spike in response to determining that the peak of the CGI derivative signal is greater than the CGI derivative threshold, that the peak of the lagged CGI derivative signal is greater than the lagged CGI derivative threshold, and that the peak of the washout CGI signal is greater than the washout CGI threshold.

Example 3 includes the apparatus of Example 1. In Example 3, the processor circuitry is to execute the machine-readable instructions to compare a CGI crossing point of a lagged CGI derivative signal generated from the CGI signal data to a lagged CGI derivative threshold. In Example 3, the processor circuitry is to execute the machine-readable instructions to compare a last valid CGI point of the CGI signal data to a low CGI threshold. In Example 3, the processor circuitry is to execute the machine-readable instructions to compare a CGI crossing point of a washout CGI signal generated from the CGI signal data to a washout CGI threshold. In Example 3, the processor circuitry is to execute the machine-readable instructions to classify the spike as an artificial spike in response to determining that the CGI crossing point of the lagged CGI derivative signal is greater than the lagged CGI derivative threshold and/or the CGI crossing point of the washout CGI signal is greater than the washout CGI threshold, and that the last valid CGI point of the CGI signal data is less than the low CGI threshold.

Example 4 includes the apparatus of Example 1. In Example 4, the processor circuitry is to execute the machine-readable instructions to determine a start time associated with the artificial spike. In Example 4, the processor circuitry is to execute the machine-readable instructions to determine an end time associated with the transient response. In Example 4, the processor circuitry is to execute the machine-readable instructions to remove a portion of the CGI signal data extending from the start time to the end time. In Example 4, the processor circuitry is to execute the machine-readable instructions to replace the removed portion of the CGI signal data with edited CGI signal data corresponding to a last valid CGI point of the CGI signal data.

Example 5 includes the apparatus of Example 4, wherein the processor circuitry is to execute the machine-readable instructions to determine the start time associated with the artificial spike based on a CGI derivative signal generated from the CGI signal data.

Example 6 includes the apparatus of Example 4, wherein the processor circuitry is to execute the machine-readable instructions to determine the end time associated with the transient response based on a smoothed lagged CGI derivative signal generated from the CGI signal data.

Example 7 includes the apparatus of Example 6. In Example 7, the processor circuitry is to execute the machine-readable instructions to determine a convergence starting point of the smoothed lagged CGI derivative signal. In Example 7, the processor circuitry is to execute the machine-readable instructions to determine the end time associated with the transient response based further on the convergence starting point, wherein the end time is subsequent to a time associated with the convergence starting point.

Example 8 includes a non-transitory machine-readable storage medium comprising instructions. When executed, the instructions of Example 8 cause processor circuitry to identify a spike in CGI signal data. When executed, the instructions of Example 8 cause the processor circuitry to determine whether the spike is an artificial spike. When executed, the instructions of Example 8 cause the processor circuitry, in response to determining that the spike is an artificial spike, to replace a portion of the CGI signal data including the artificial spike and a transient response of the artificial spike with edited CGI signal data.

Example 9 includes the non-transitory machine-readable storage medium of Example 8. When executed, the instructions of Example 9 cause the processor circuitry to compare a peak of a CGI derivative signal generated from the CGI signal data to a CGI derivative threshold. When executed, the instructions of Example 9 cause the processor circuitry to compare a peak of a lagged CGI derivative signal generated from the CGI signal data to a lagged CGI derivative threshold. When executed, the instructions of Example 9 cause the processor circuitry to compare a peak of a washout CGI signal generated from the CGI signal data to a washout CGI threshold. When executed, the instructions of Example 9 cause the processor circuitry to identify that the CGI signal data includes the spike in response to determining that the peak of the CGI derivative signal is greater than the CGI derivative threshold, that the peak of the lagged CGI derivative signal is greater than the lagged CGI derivative threshold, and that the peak of the washout CGI signal is greater than the washout CGI threshold.

Example 10 includes the non-transitory machine-readable storage medium of Example 8. When executed, the instructions of Example 10 cause the processor circuitry to compare a CGI crossing point of a lagged CGI derivative signal generated from the CGI signal data to a lagged CGI derivative threshold. When executed, the instructions of Example 10 cause the processor circuitry to compare a CGI crossing point of a washout CGI signal generated from the CGI signal data to a washout CGI threshold. When executed, the instructions of Example 10 cause the processor circuitry to compare a last valid CGI point of the CGI signal data to a low CGI threshold. When executed, the instructions of Example 10 cause the processor circuitry to classify the spike as an artificial spike in response to determining that the CGI crossing point of the lagged CGI derivative signal is greater than the lagged CGI derivative threshold and/or the CGI crossing point of the washout CGI signal is greater than the washout CGI threshold, and that the last valid CGI point of the CGI signal data is less than the low CGI threshold.

Example 11 includes the non-transitory machine-readable storage medium of Example 8. When executed, the instructions of Example 11 cause the processor circuitry to determine a start time associated with the artificial spike. When executed, the instructions of Example 11 cause the processor circuitry to determine an end time associated with the transient response. When executed, the instructions of Example 11 cause the processor circuitry to remove a portion of the CGI signal data extending from the start time to the end time. When executed, the instructions of Example 11 cause the processor circuitry to replace the removed portion of the CGI signal data with edited CGI signal data corresponding to a last valid CGI point of the CGI signal data.

Example 12 includes the non-transitory machine-readable storage medium of Example 11, wherein the instructions, when executed, cause the processor circuitry to determine the start time associated with the artificial spike based on a CGI derivative signal generated from the CGI signal data.

Example 13 includes the non-transitory machine-readable storage medium of Example 11, wherein the instructions, when executed, cause the processor circuitry to determine the end time associated with the transient response based on a smoothed lagged CGI derivative signal generated from the CGI signal data.

Example 14 includes the non-transitory machine-readable storage medium of Example 13. When executed, the instructions of Example 14 cause the processor circuitry to determine a convergence starting point of the smoothed lagged CGI derivative signal. When executed, the instructions of Example 14 cause the processor circuitry to determine the end time associated with the transient response based further on the convergence starting point, wherein the end time is subsequent to a time associated with the convergence starting point.

Example 15 is a method. In Example 15, the method comprises identifying, by executing machine-readable instructions with processor circuitry, a spike in CGI signal data. In Example 15, the method comprises determining, by executing machine-readable instructions with the processor circuitry, whether the spike is an artificial spike. In Example 15, the method comprises, in response to determining that the spike is an artificial spike, replacing, by executing machine-readable instructions with the processor circuitry, a portion of the CGI signal data including the artificial spike and a transient response of the artificial spile with edited CGI signal data.

Example 16 includes the method of Example 15. In Example 16, the method includes comparing a peak of a CGI derivative signal generated from the CGI signal data to a CGI derivative threshold. In Example 16, the method includes comparing a peak of a lagged CGI derivative signal generated from the CGI signal data to a lagged CGI derivative threshold. In Example 16, the method includes comparing a peak of a washout CGI signal generated from the CGI signal data to a washout CGI threshold. In Example 16, the method includes identifying that the CGI signal data includes the spike in response to determining that the peak of the CGI derivative signal is greater than the CGI derivative threshold, that the peak of the lagged CGI derivative signal is greater than the lagged CGI derivative threshold, and that the peak of the washout CGI signal is greater than the washout CGI threshold.

Example 17 includes the method of Example 15. In Example 17, the method includes comparing a CGI crossing point of a lagged CGI derivative signal generated from the CGI signal data to a lagged CGI derivative threshold. In Example 17, the method includes comparing a CGI crossing point of a washout CGI signal generated from the CGI signal data to a washout CGI threshold. In Example 17, the method includes comparing a last valid CGI point of the CGI signal data to a low CGI threshold. In Example 17, the method includes classifying the spike as an artificial spike in response to determining that the CGI crossing point of the lagged CGI derivative signal is greater than the lagged CGI derivative threshold and/or the CGI crossing point of the washout CGI signal is greater than the washout CGI threshold, and that the last valid CGI point of the CGI signal data is less than the low CGI threshold.

Example 18 includes the method of Example 15. In Example 18, the method includes determining a start time associated with the artificial spike. In Example 18, the method includes determining an end time associated with the transient response. In Example 18, the method includes removing a portion of the CGI signal data extending from the start time to the end time. In Example 18, the method includes replacing the removed portion of the CGI signal data with edited CGI signal data corresponding to a last valid CGI point of the CGI signal data.

Example 19 includes the method of Example 18, wherein the start time associated with the artificial spike is determined based on a CGI derivative signal generated from the CGI signal data.

Example 20 includes the method of Example 18, wherein the end time associated with the transient response is determined based on a smoothed lagged CGI derivative signal generated from the CGI signal data.

Example 21 includes the method of Example 20. In Example 20, the end time associated with the transient response is determined based further on a convergence starting point of the smoothed lagged CGI derivative signal, wherein the end time is subsequent to a time associated with the convergence starting point.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to identify, classify, and edit artificial spikes in cruise guide indicator (CGI) signal data for an aircraft, the apparatus comprising:

memory;

machine-readable instructions; and processor circuitry to execute the machine-readable instructions to:

compare, in a first comparison, a peak of a CGI derivative signal generated from the CGI signal data to a CGI derivative threshold;

compare, in a second comparison, a peak of a lagged CGI derivative signal generated from the CGI signal data to a lagged CGI derivative threshold;

compare, in a third comparison, a peak of a washout CGI signal generated from the CGI signal data to a washout CGI threshold;

identify a spike in the CGI signal data based on the first, second and third comparisons;

determine whether the spike is an artificial spike;

in response to determining that the spike is an artificial spike, replace a portion of the CGI signal data including the artificial spike and a transient response of the artificial spike with edited CGI signal data; and cause a display to show the CGI signal data with the replaced portion.

2. The apparatus of claim 1, wherein the spike in the CGI signal data is identified based on determining that the peak of the CGI derivative signal is greater than the CGI derivative threshold, that the peak of the lagged CGI derivative signal is greater than the lagged CGI derivative threshold, and that the peak of the washout CGI signal is greater than the washout CGI threshold.

3. The apparatus of claim 1, wherein the processor circuitry is to execute the machine-readable instructions to:

compare a CGI crossing point of the lagged CGI derivative signal generated from the CGI signal data to a lagged CGI derivative threshold;

compare a CGI crossing point of the washout CGI signal generated from the CGI signal data to a washout CGI threshold;

compare a last valid CGI point of the CGI signal data to a low CGI threshold; and classify the spike as an artificial spike in response to determining that either the CGI crossing point of the lagged CGI derivative signal is greater than the lagged CGI derivative threshold or the CGI crossing point of the washout CGI signal is greater than the washout CGI threshold, and that the last valid CGI point of the CGI signal data is less than the low CGI threshold.

4. The apparatus of claim 1, wherein the processor circuitry is to execute the machine-readable instructions to:

determine a start time associated with the artificial spike;

determine an end time associated with the transient response;

remove a portion of the CGI signal data extending from the start time to the end time; and replace the removed portion of the CGI signal data with edited CGI signal data corresponding to a last valid CGI point of the CGI signal data.

5. The apparatus of claim 4, wherein the processor circuitry is to execute the machine-readable instructions to determine the start time associated with the artificial spike based on the CGI derivative signal generated from the CGI signal data.

6. The apparatus of claim 4, wherein the processor circuitry is to execute the machine-readable instructions to determine the end time associated with the transient response based on a smoothed lagged CGI derivative signal generated from the CGI signal data.

7. The apparatus of claim 6, wherein the processor circuitry is to execute the machine-readable instructions to:

determine a convergence starting point of the smoothed lagged CGI derivative signal; and determine the end time associated with the transient response based further on the convergence starting point, wherein the end time is subsequent to a time associated with the convergence starting point.

8. A non-transitory machine-readable storage medium comprising instructions that, when executed, cause processor circuitry to at least:

compare, in a first comparison, a peak of a cruise guide indicator (CGI) derivative signal generated from CGI signal data to a CGI derivative threshold;

compare, in a second comparison, a peak of a lagged CGI derivative signal generated from the CGI signal data to a lagged CGI derivative threshold;

compare, in a third comparison, a peak of a washout CGI signal generated from the CGI signal data to a washout CGI threshold;

identify a spike in CGI signal data based on the first, second and third comparisons;

determine whether the spike is an artificial spike;

in response to determining that the spike is an artificial spike, replace a portion of the CGI signal data including the artificial spike and a transient response of the artificial spike with edited CGI signal data; and cause a display to show the CGI signal data with the replaced portion.

9. The non-transitory machine-readable storage medium of claim 8, wherein the spike in CGI signal is identified based on determining that the peak of the CGI derivative signal is greater than the CGI derivative threshold, that the peak of the lagged CGI derivative signal is greater than the lagged CGI derivative threshold, and that the peak of the washout CGI signal is greater than the washout CGI threshold.

10. The non-transitory machine-readable storage medium of claim 8, wherein the instructions, when executed, cause the processor circuitry to:

compare a CGI crossing point of a lagged CGI derivative signal generated from the CGI signal data to a lagged CGI derivative threshold;

compare a CGI crossing point of a washout CGI signal generated from the CGI signal data to a washout CGI threshold;

compare a last valid CGI point of the CGI signal data to a low CGI threshold; and classify the spike as an artificial spike in response to determining that either the CGI crossing point of the lagged CGI derivative signal is greater than the lagged CGI derivative threshold or the CGI crossing point of the washout CGI signal is greater than the washout CGI threshold, and that the last valid CGI point of the CGI signal data is less than the low CGI threshold.

11. The non-transitory machine-readable storage medium of claim 8, wherein the instructions, when executed, cause the processor circuitry to:

determine a start time associated with the artificial spike;

determine an end time associated with the transient response;

remove a portion of the CGI signal data extending from the start time to the end time; and replace the removed portion of the CGI signal data with edited CGI signal data corresponding to a last valid CGI point of the CGI signal data.

12. The non-transitory machine-readable storage medium of claim 11, wherein the instructions, when executed, cause the processor circuitry to determine the start time associated with the artificial spike based on the CGI derivative signal generated from the CGI signal data.

13. The non-transitory machine-readable storage medium of claim 11, wherein the instructions, when executed, cause the processor circuitry to determine the end time associated with the transient response based on a smoothed lagged CGI derivative signal generated from the CGI signal data.

14. The non-transitory machine-readable storage medium of claim 13, wherein the instructions, when executed, cause the processor circuitry to:

determine a convergence starting point of the smoothed lagged CGI derivative signal; and determine the end time associated with the transient response based further on the convergence starting point, wherein the end time is subsequent to a time associated with the convergence starting point.

15. A method to identify, classify, and edit artificial spikes in CGI) signal data, the method comprising:

comparing, with a first comparison, a peak of a CGI derivative signal generated from the CGI signal data to a CGI derivative threshold;

comparing, with a second comparison, a peak of a lagged CGI derivative signal generated from the CGI signal data to a lagged CGI derivative threshold;

comparing, with a third comparison, a peak of a washout CGI signal generated from the CGI signal data to a washout CGI threshold;

identifying, by executing machine-readable instructions with processor circuitry, a spike in the CGI signal data based on the first, second and third comparisons;

determining, by executing machine-readable instructions with the processor circuitry, whether the spike is an artificial spike;

in response to determining that the spike is an artificial spike, replacing, by executing machine-readable instructions with the processor circuitry, a portion of the CGI signal data including the artificial spike and a transient response of the artificial spike with edited CGI signal data; and causing a display to show the CGI signal data with the replaced portion.

16. The method of claim 15, wherein identifying that the CGI signal data includes the spike is based on determining that the peak of the CGI derivative signal is greater than the CGI derivative threshold, that the peak of the lagged CGI derivative signal is greater than the lagged CGI derivative threshold, and that the peak of the washout CGI signal is greater than the washout CGI threshold.

17. The method of claim 15, wherein determining whether the spike is an artificial spike includes:

comparing a CGI crossing point of the lagged CGI derivative signal generated from the CGI signal data to a lagged CGI derivative threshold;

comparing a CGI crossing point of the washout CGI signal generated from the CGI signal data to a washout CGI threshold;

comparing a last valid CGI point of the CGI signal data to a low CGI threshold; and classifying the spike as an artificial spike in response to determining that either the CGI crossing point of the lagged CGI derivative signal is greater than the lagged CGI derivative threshold or the CGI crossing point of the washout CGI signal is greater than the washout CGI threshold, and that the last valid CGI point of the CGI signal data is less than the low CGI threshold.

18. The method of claim 15, wherein replacing the portion of the CGI signal data including the artificial spike and the transient response of the artificial spike with edited CGI signal data includes:

determining a start time associated with the artificial spike;

determining an end time associated with the transient response;

removing a portion of the CGI signal data extending from the start time to the end time; and replacing the removed portion of the CGI signal data with edited CGI signal data corresponding to a last valid CGI point of the CGI signal data.

19. The method of claim 18, wherein the start time associated with the artificial spike is determined based on the CGI derivative signal generated from the CGI signal data.

20. The method of claim 18, wherein the end time associated with the transient response is determined based on a smoothed lagged CGI derivative signal generated from the CGI signal data.

21. The method of claim 20, wherein the end time associated with the transient response is determined based further on a convergence starting point of the smoothed lagged CGI derivative signal, wherein the end time is subsequent to a time associated with the convergence starting point.

* * * * *